United States Patent
Zemo, Jr.

(10) Patent No.: US 10,632,576 B1
(45) Date of Patent: *Apr. 28, 2020

(54) METHOD AND APPARATUS FOR REMOVING OR REINSTALLING RISER PIPES OF A RISER BUNDLE

(71) Applicant: Coastal Cargo Company, Inc., New Orleans, LA (US)

(72) Inventor: Don M. Zemo, Jr., River Ridge, LA (US)

( * ) Notice: Subject to any disclaimer, the term of this patent is extended or adjusted under 35 U.S.C. 154(b) by 16 days.

This patent is subject to a terminal disclaimer.

(21) Appl. No.: 15/853,651

(22) Filed: Dec. 22, 2017

Related U.S. Application Data

(63) Continuation of application No. 15/006,255, filed on Jan. 26, 2016, now Pat. No. 9,849,550, which is a continuation of application No. 14/287,626, filed on May 27, 2014, now Pat. No. 9,242,319, which is a continuation of application No. 13/545,335, filed on Jul. 10, 2012, now Pat. No. 8,732,931, which is a continuation of application No. 12/616,344, filed on Nov. 11, 2009, now Pat. No. 8,214,993.

(51) Int. Cl.
*B23P 19/00* (2006.01)
*E21B 19/00* (2006.01)
*B23P 19/04* (2006.01)

(52) U.S. Cl.
CPC .......... *B23P 19/04* (2013.01); *E21B 19/002* (2013.01); *Y10T 29/49819* (2015.01); *Y10T 29/49826* (2015.01); *Y10T 29/5367* (2015.01); *Y10T 29/53261* (2015.01); *Y10T 29/53539* (2015.01); *Y10T 29/53548* (2015.01); *Y10T 29/53983* (2015.01); *Y10T 29/53991* (2015.01)

(58) Field of Classification Search
CPC .. B23P 19/04; E21B 19/002; Y10T 29/53991; Y10T 29/53539; Y10T 29/49819; Y10T 29/53983; Y10T 29/53548; Y10T 29/5367; Y10T 29/53261; Y10T 29/49826
See application file for complete search history.

(56) References Cited

U.S. PATENT DOCUMENTS 9,242,319 B1 * 1/2016 Zemo, Jr. .............. E21B 19/002

* cited by examiner

*Primary Examiner* — John C Hong
(74) *Attorney, Agent, or Firm* — Roy Kiesel Ford Doody & North, APLC; Brett A. North

(57) ABSTRACT

A method of servicing a pipe bundle or riser bundle employs a specially configured hoist having a rail that supports multiple lifts. A selected satellite pipe/conduit of the pipe bundle is both lifted and pulled horizontally in order to remove it from a plurality of supports that hold the satellite pipes together in spaced apart positions. During removal of a satellite pipe, the lifts elevate, then travel with and hold the pipe as it moves horizontally away from the bundle.

20 Claims, 25 Drawing Sheets

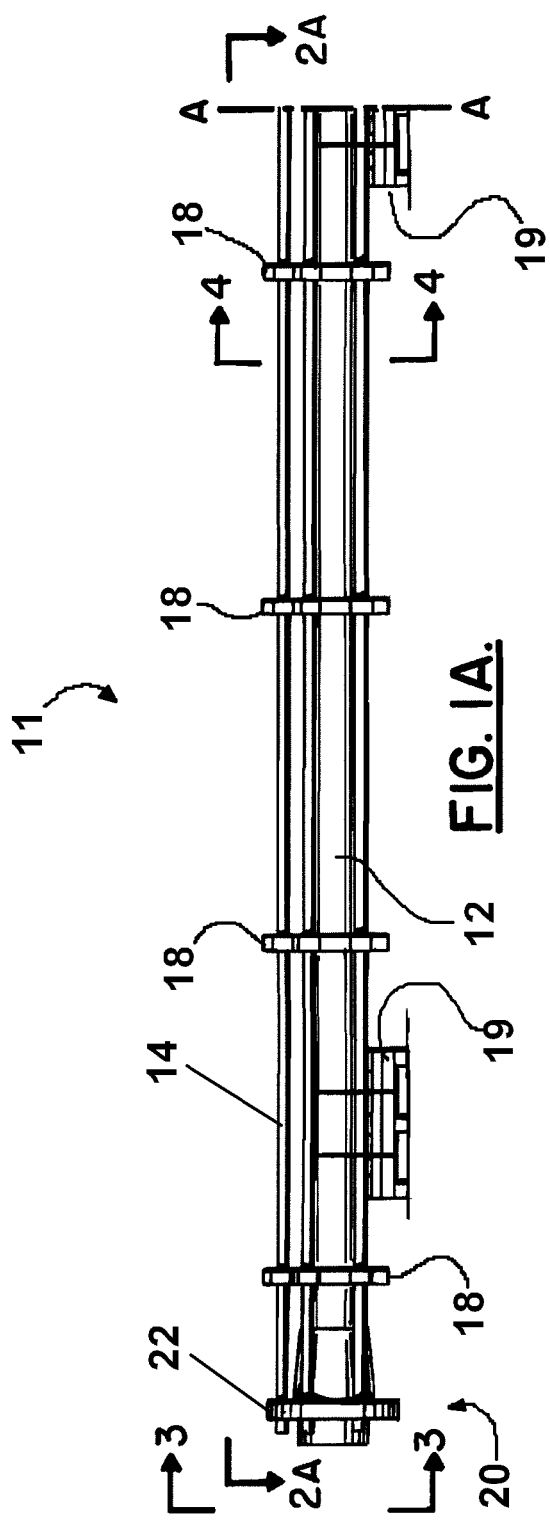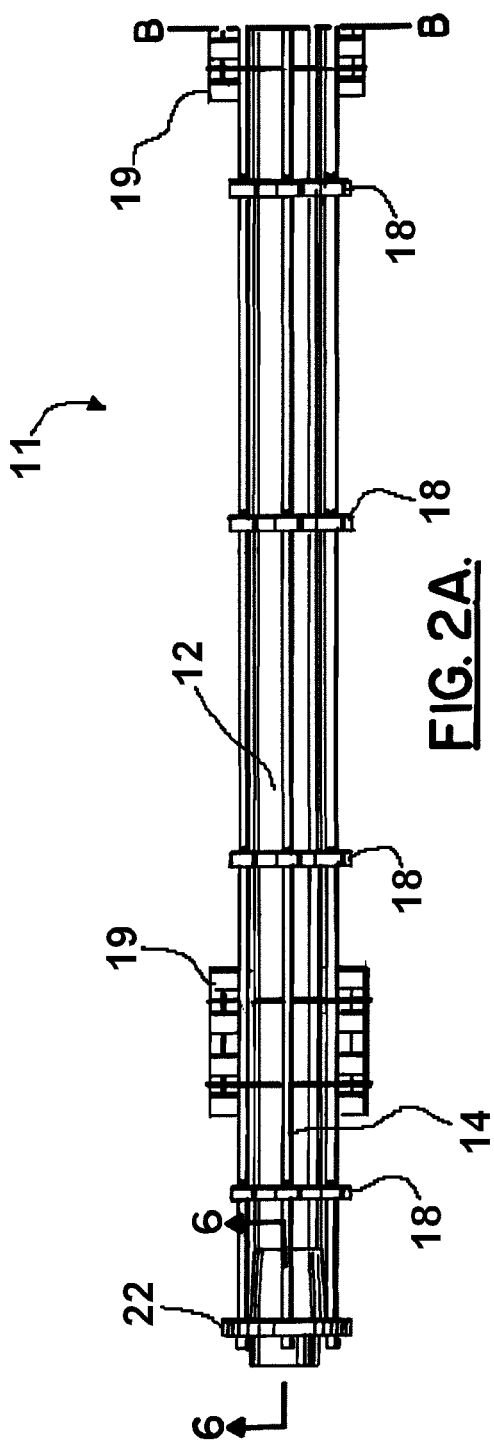

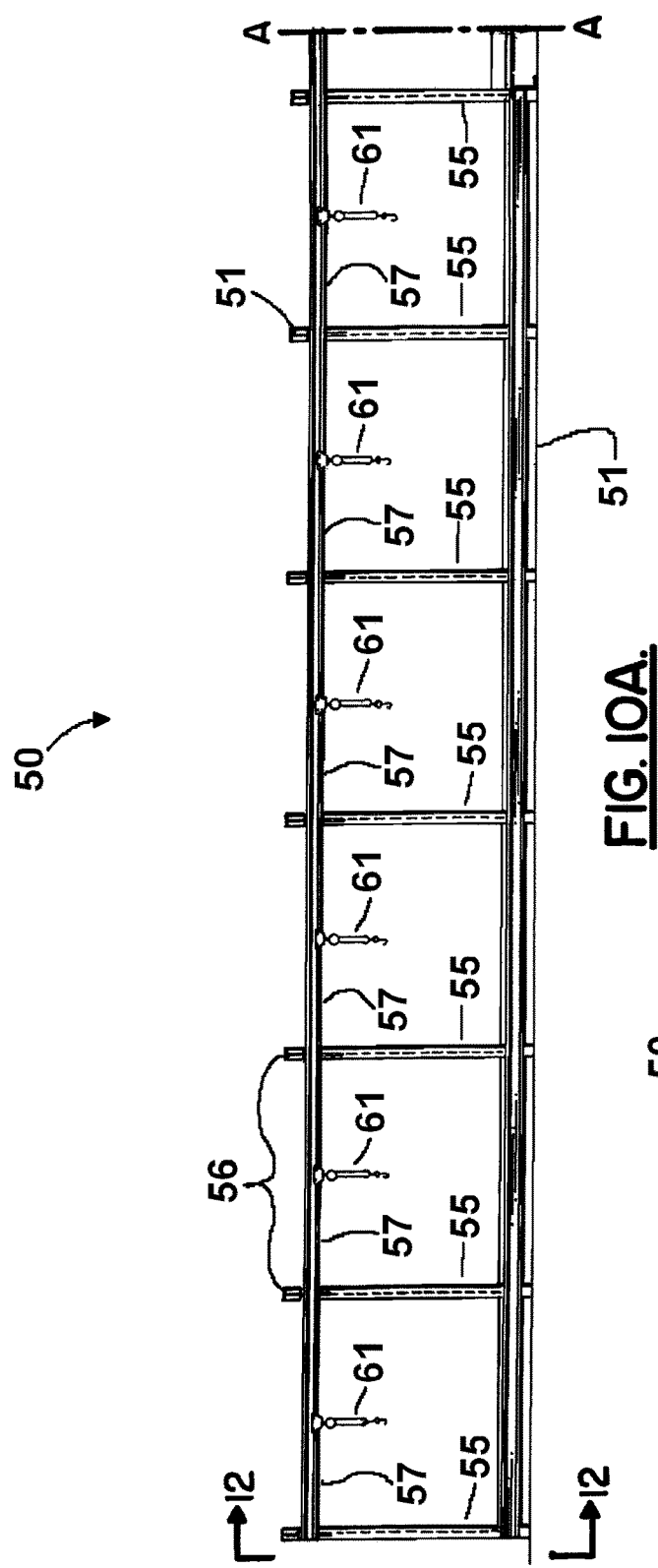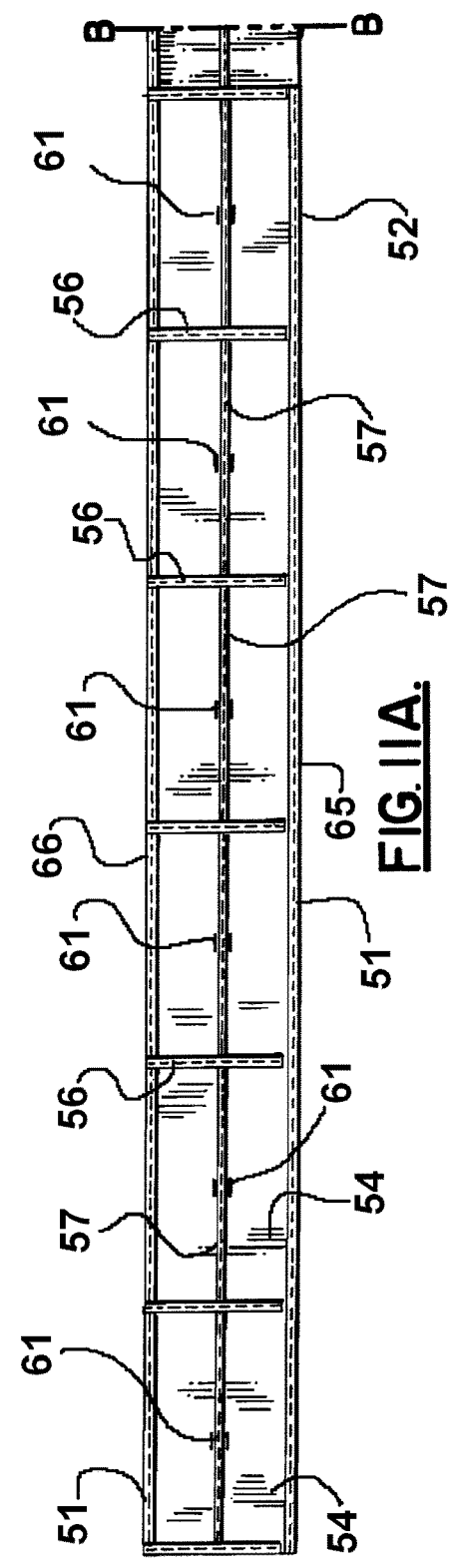

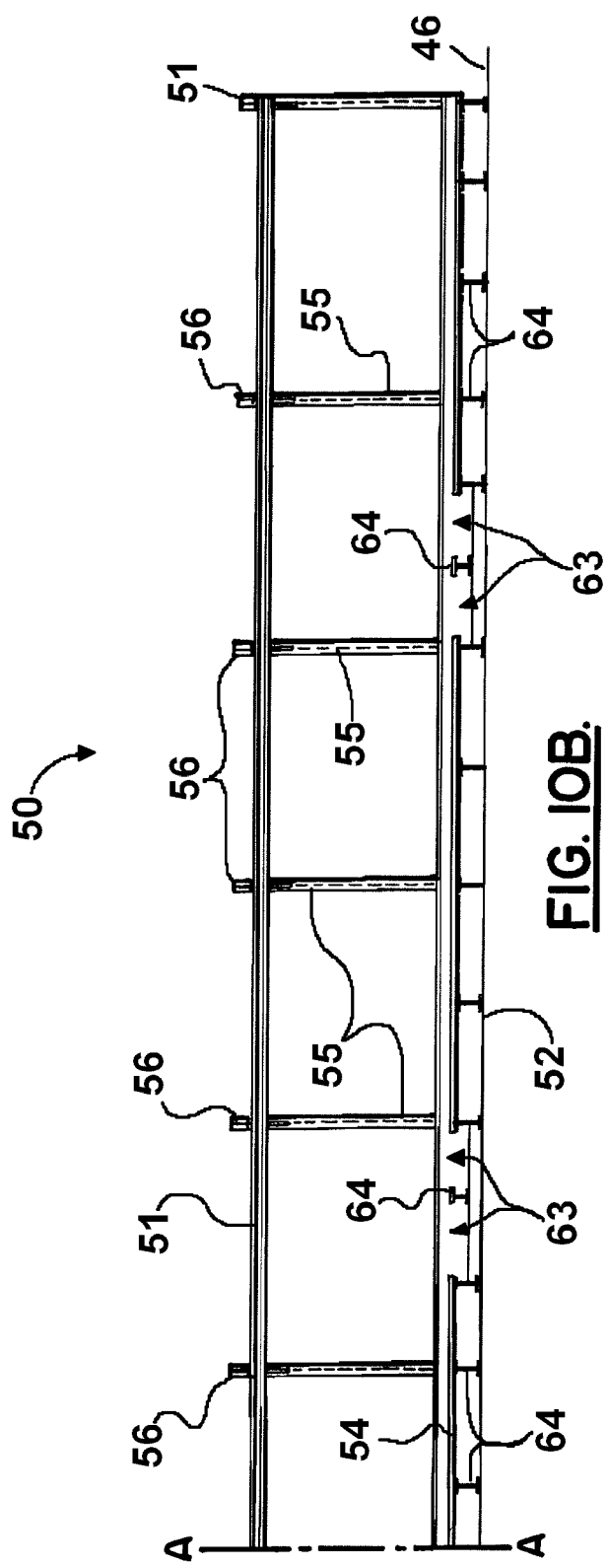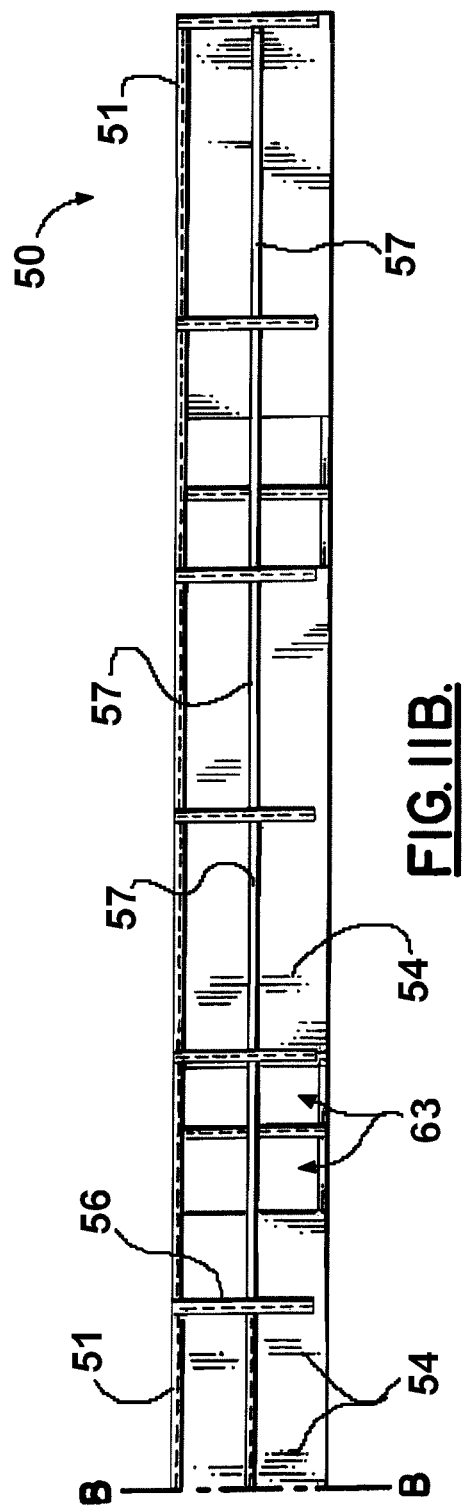
FIG. 10B.
FIG. 11B.

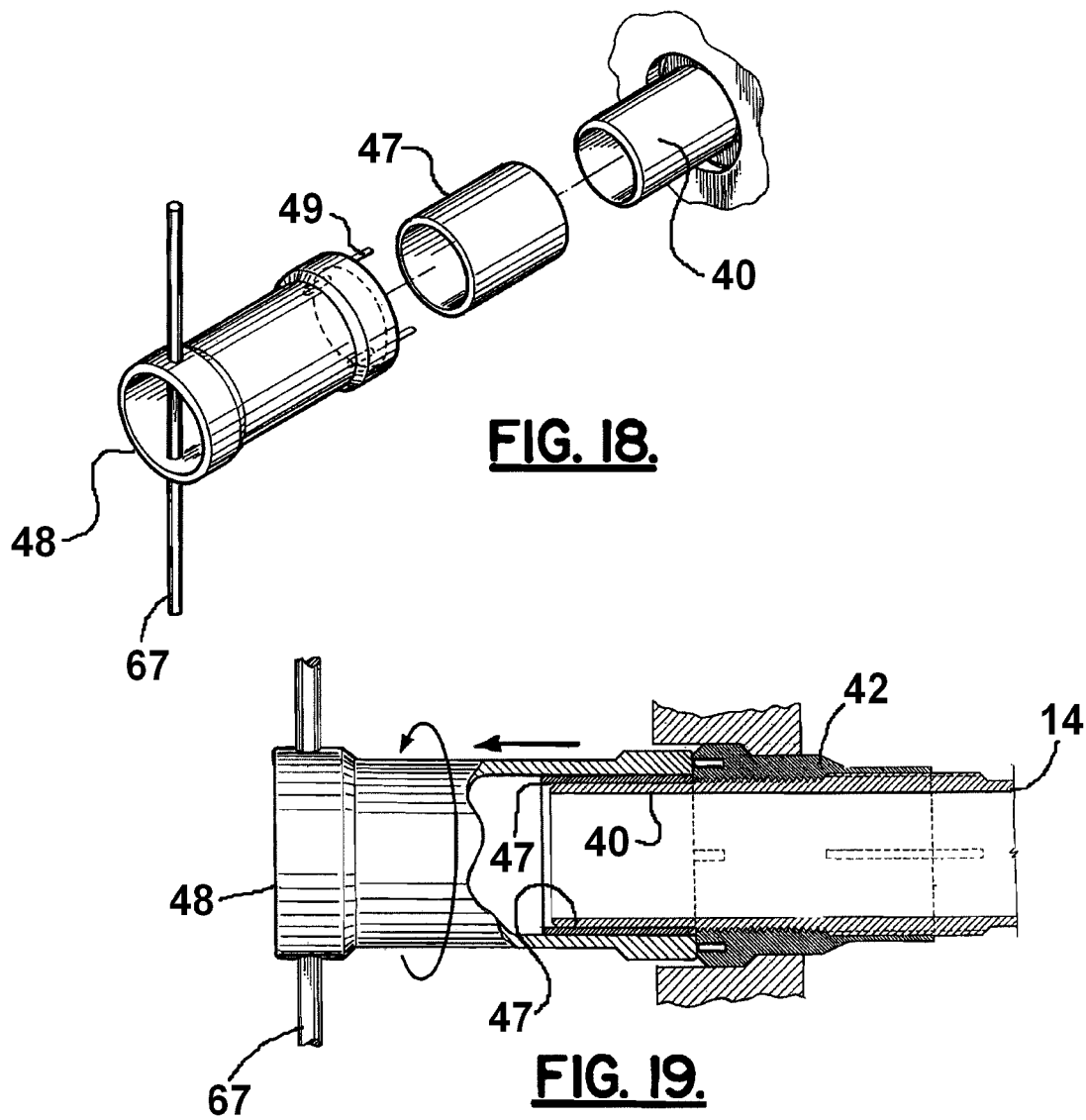
FIG. 18.
FIG. 19.
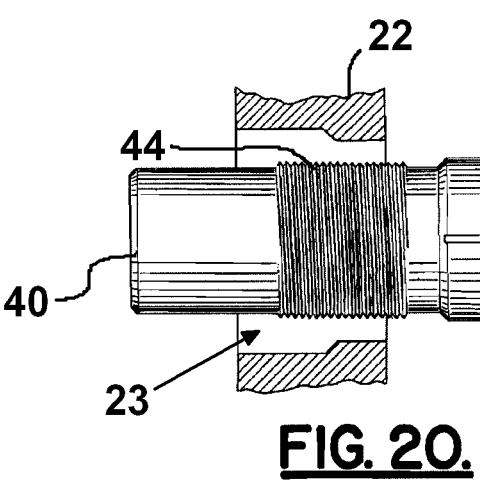
FIG. 20.

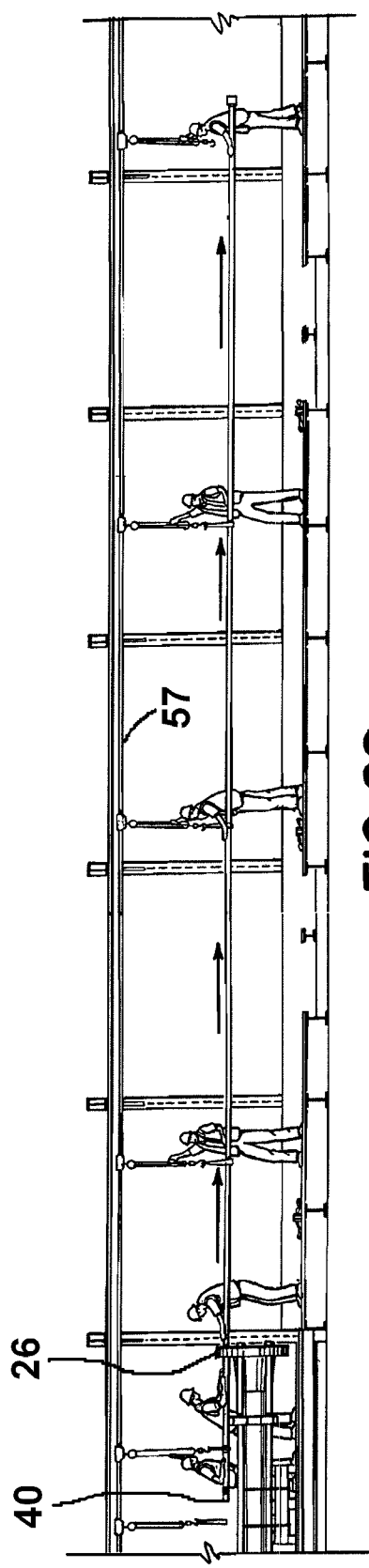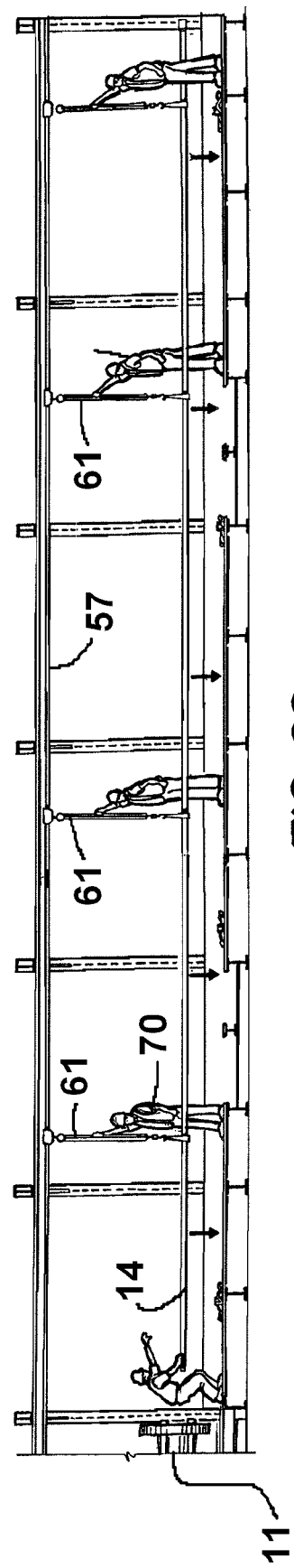

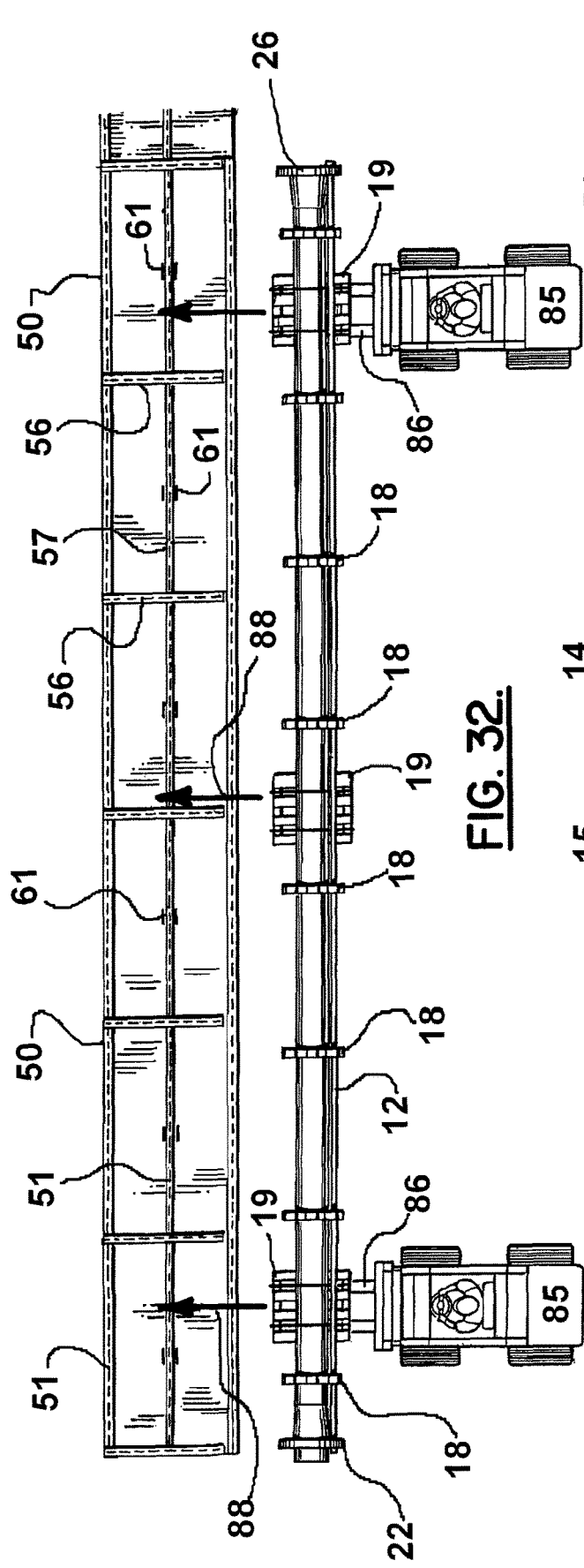
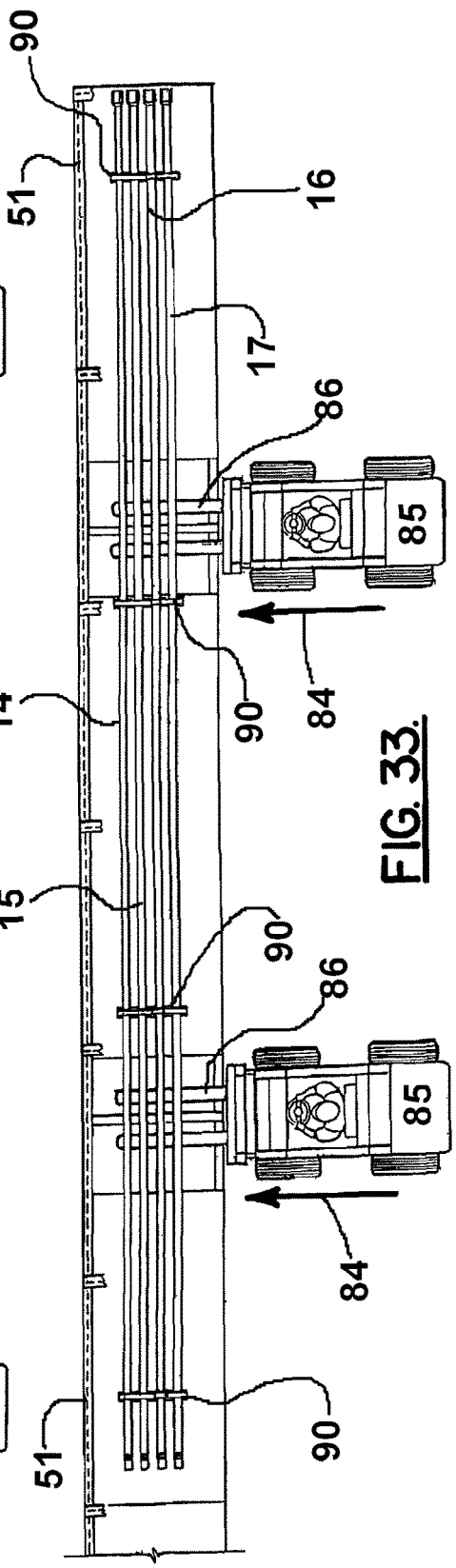
FIG. 32.
FIG. 33.

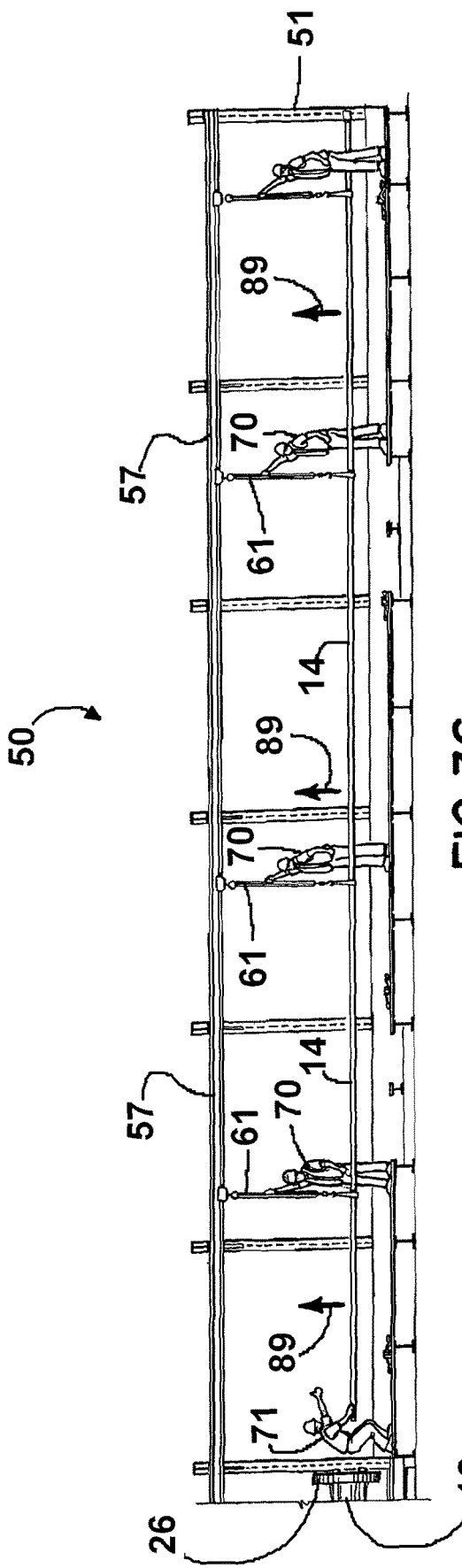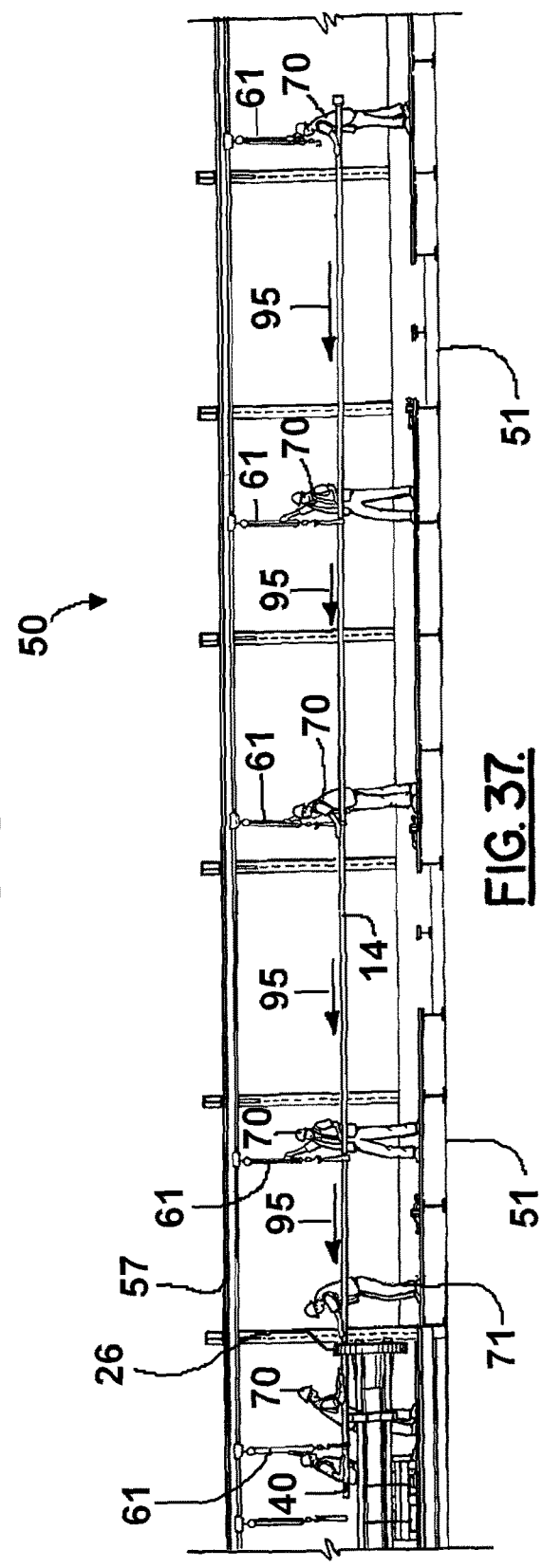

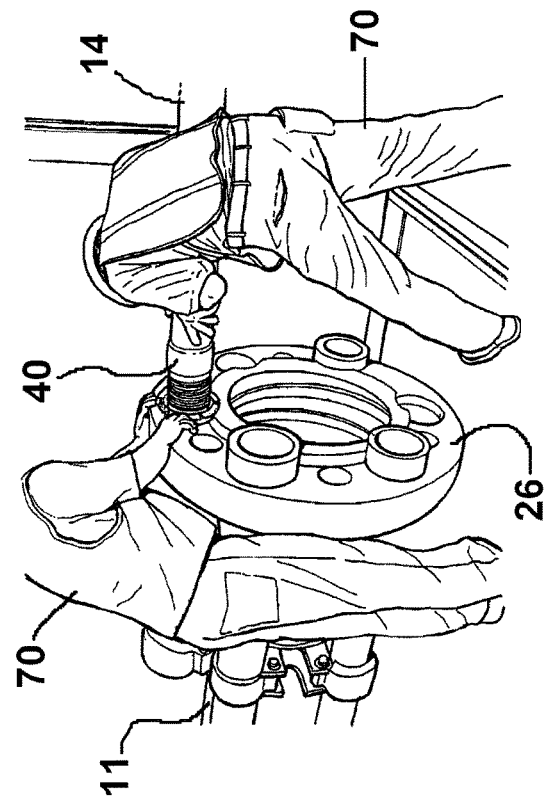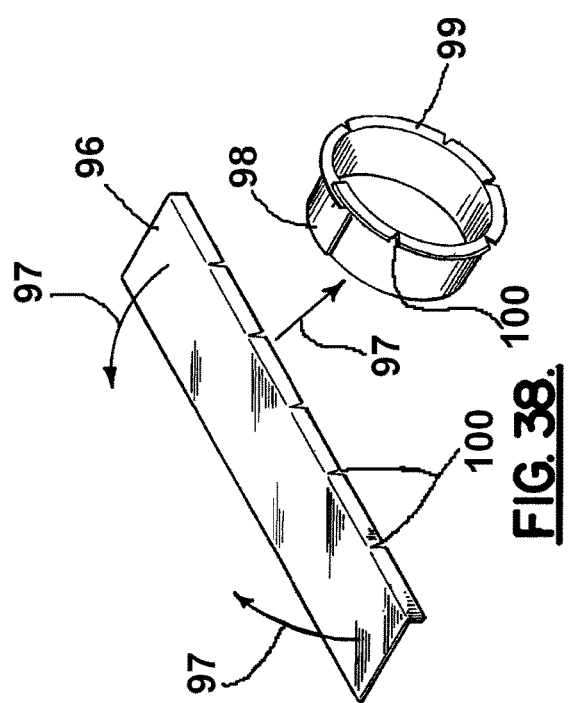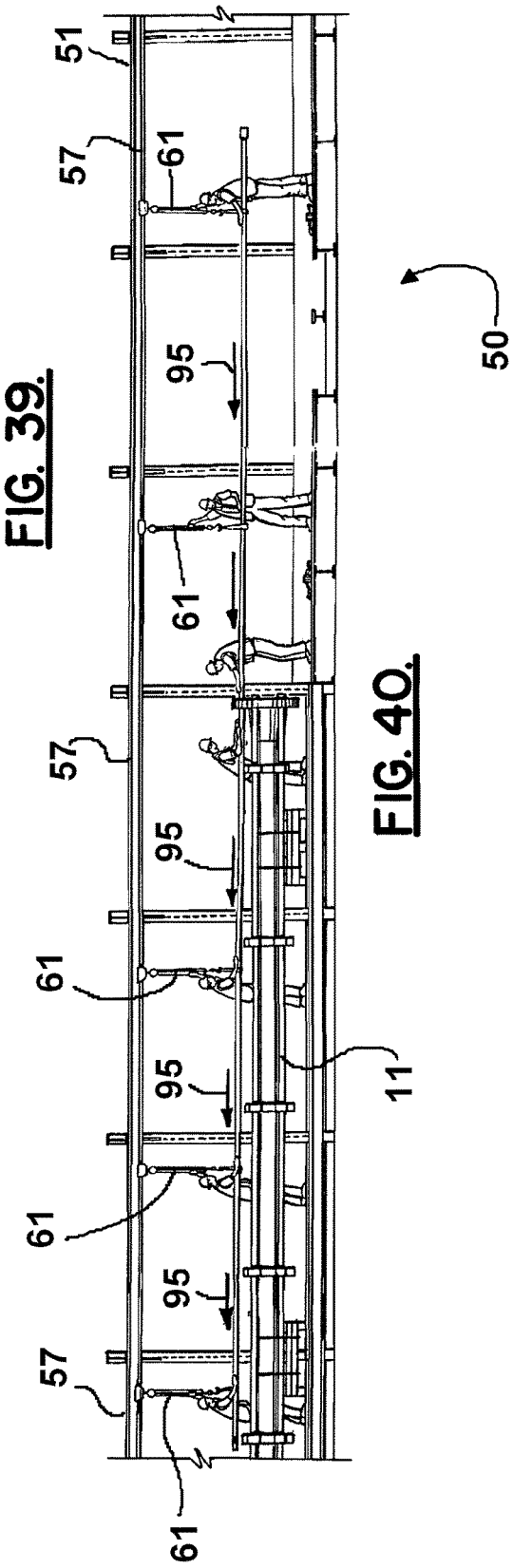
FIG. 39.
FIG. 38.
FIG. 40.

METHOD AND APPARATUS FOR REMOVING OR REINSTALLING RISER PIPES OF A RISER BUNDLE

CROSS-REFERENCE TO RELATED APPLICATIONS

This is a continuation of U.S. patent application Ser. No. 15/006,255, filed on Jan. 26, 2016 (issued as U.S. Pat. No. 9,849,550 on Dec. 26, 2017), which is a continuation of U.S. patent application Ser. No. 14/287,626, filed on May 27, 2014 (issued as U.S. Pat. No. 9,242,319 on Jan. 26, 2016) which is a continuation of U.S. patent application Ser. No. 13/545,335, filed on Jul. 10, 2012 (issued as U.S. Pat. No. 8,732,931 on May 27, 2014), which is a continuation of U.S. patent application Ser. No. 12/616,344, filed Nov. 11, 2009 (issued as U.S. Pat. No. 8,214,993 on Jul. 10, 2012), which applications are incorporated herein by reference and to which priority is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to riser bundles and the repair or replacement of the satellite tubes or pipes of a riser bundle. More particularly, the present invention relates to an improved method and apparatus for removing one or more satellite tubes or conduits or pipes from a riser bundle, wherein a specially configured hoist and rail arrangement includes separate lifts spaced longitudinally along the riser bundle that enable the removal of a selected satellite tube or conduit or pipe by lifting the selected tube or conduit and then pulling the selected satellite tube or conduit or pipe longitudinally through an opening in an end flange of the riser bundle while the separate lifts travel along the rail while supporting the tube or conduit.

2. General Background of the Invention

Riser bundles are commonly employed in the collection of petroleum from deep water wells. Examples of riser bundles can be seen for example in U.S. Pat. Nos. 3,911,688; 4,182,584; 4,194,568; 4,388,022; and 6,267,537, each of said patents being incorporated herein by reference.

BRIEF SUMMARY OF THE INVENTION

The present invention provides a method of removing a satellite pipe from a pipe bundle that includes multiple satellite pipes supported by a plurality of spaced apart pipe supports. The supports can include end supports and intermediate supports.

The method includes first supporting the pipe bundle in a generally horizontal position.

A hoisting apparatus is provided that includes an overhead rail. The pipe bundle is positioned under the rail, the rail extending along the pipe bundle and generally aligned with the pipe bundle.

A plurality of lifts are attached to a selected satellite pipe that is to be removed or serviced. Each lift provides a carriage mounted for travel on the rail and is supported by the carriage, the carriage enabling the lift to travel along the rail.

The selected satellite pipe is separated from the intermediate supports and from at least one of the end supports. The selected satellite pipe is then elevated with the lifts, each lift being able to change the elevation of the satellite pipe independently of the other lifts.

The selected satellite pipe is moved longitudinally toward one of the end supports, wherein the lifts move simultaneously with the satellite pipe, each lift carriage traveling in the same direction upon the rail.

In one embodiment, an end support has an opening and a satellite pipe moves through the opening until it is separated from the pipe bundle.

In one embodiment, each support spaces the satellite pipes circumferentially apart.

In one embodiment, the pipe bundle is transported laterally from a first position that is spaced away from the hoisting apparatus to a second position which is in a position aligned with the rail.

In one embodiment, the pipe bundle is transported laterally by lifting the pipe bundles with one or more wheeled vehicles.

In one embodiment, the wheeled vehicles are forklift vehicles.

In one embodiment, the method includes supporting the pipe bundle with multiple cradles, each cradle having a base that is configured to rest upon an underlying, generally flat support surface such as a shop floor, slab, or the earth's surface.

In one embodiment, each cradle has an upper end portion that conforms to the shape of the pipe bundle.

In one embodiment, each of the satellite pipes has a male end portion and a female end portion. The end supports are male and female end supports. The satellite pipe male end portion is supported by a male end support. The satellite pipe female portion is supported by a female end support. The satellite pipe travels toward the female end support when it is being removed from the pipe bundle.

In one embodiment, the hoisting apparatus has a base with decking.

In one embodiment, the decking has open areas and the pipe bundle is transported laterally by lifting the pipe bundles with one or more wheeled vehicles (e.g. forklift vehicles) having forklift tines that extend into the open areas.

In one embodiment, the method includes providing a human operator next to each lift for operating the lift. In one embodiment, a supervisor conveys commands to the operators regarding elevation information for a particular lift. The supervisor can be positioned next to one of the bundle end supports such as the female bundle end support.

In one embodiment, a lift is provided in between each pair of supports.

In one embodiment, there is a lift positioned in between a pair of intermediate supports.

In one embodiment, the male end portion of each satellite pipe is connected to an end support with a fitting and further comprising the step of removing the fitting.

In one embodiment, tension is applied to one end portion of the satellite pipe to be removed during its removal.

In one embodiment, the tension can be applied to the female end portion of the satellite pipe during removal of the satellite pipe.

In one embodiment, the satellite pipe female end portion is attached to the female end support at an opening in the female end support and the pipe travels through the opening of the female end support when the pipe is being removed.

In one embodiment, the lifts support the satellite pipe on opposing sides of the female end support, thus supporting a portion of the satellite pipe that has already traveled through the opening in the female support during its removal.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIGS. 1A-1B are elevation views illustrating a riser bundle to be serviced, and wherein match lines A-A match FIG. 1A to FIG. 1B;

FIGS. 2A-2B are plan views illustrating a riser bundle to be serviced, and wherein match lines B-B match FIG. 2A to FIG. 2B;

FIGS. 10A-10B are elevation views of the hoist portion of the preferred embodiment of the apparatus of the present invention, and wherein match lines A-A match FIG. 10A to FIG. 10B;

FIGS. 11A-11B are plan views of the hoist portion of the preferred embodiment of the apparatus of the present invention, and wherein lines match lines B-B match FIG. 11A to FIG. 11B;

FIG. 18 is a partial perspective view illustrating removal of a part of a satellite tube or conduit;

FIG. 19 is a sectional view illustrating removal of a part of a satellite tube or conduit;

FIG. 20 is a partial sectional elevation view illustrating removal of a part of a satellite tube or conduit;

FIG. 28 is an elevation view illustrating a part of the method of the present invention;

FIG. 29 is an elevation view illustrating a part of the method of the present invention;

FIG. 32 is an plan view illustrating a part of the method of the present invention;

FIG. 33 is an plan view illustrating a part of the method of the present invention;

FIG. 36 is an elevation view illustrating a part of the method of the present invention;

FIG. 37 is an elevation view illustrating a part of the method of the present invention;

FIG. 38 is a partial perspective view of the preferred embodiment of the apparatus of the present invention and illustrating a part of the method of the present invention;

FIG. 39 is a partial perspective view of the preferred embodiment of the apparatus of the present invention and illustrating a part of the method of the present invention;

FIG. 40 is an elevation view illustrating a part of the method of the present invention;

DETAILED DESCRIPTION OF THE INVENTION

Figure 1B:
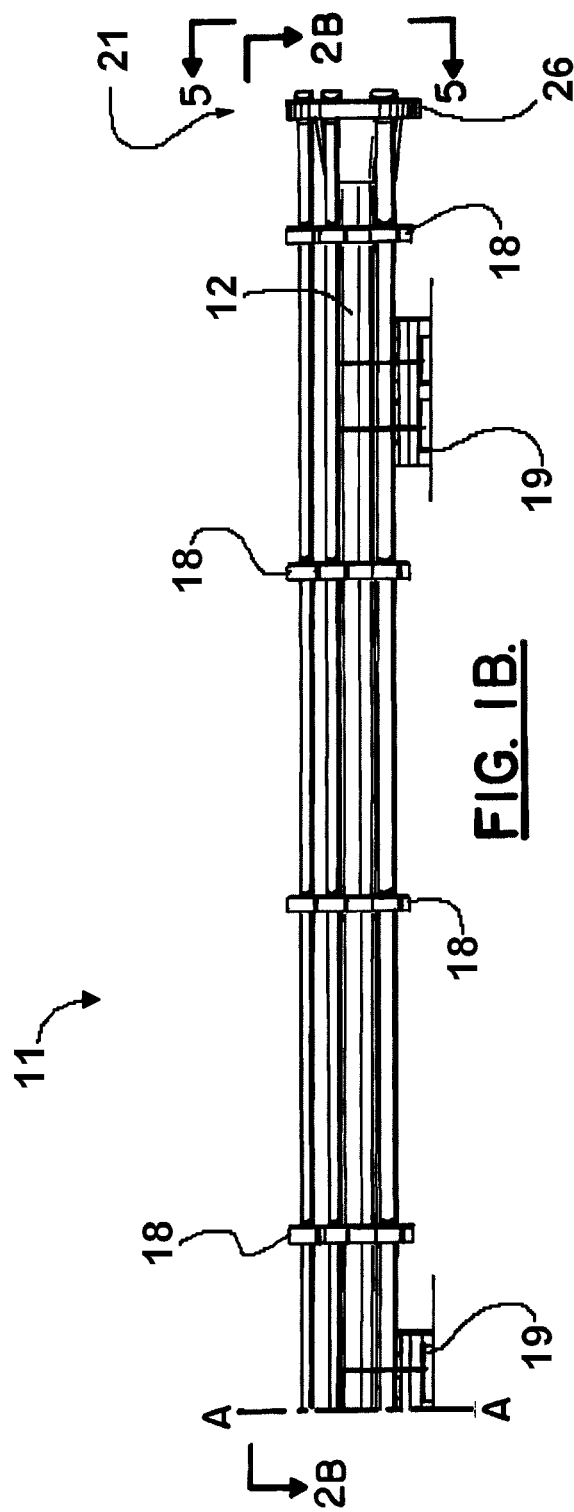
Figure 2B:
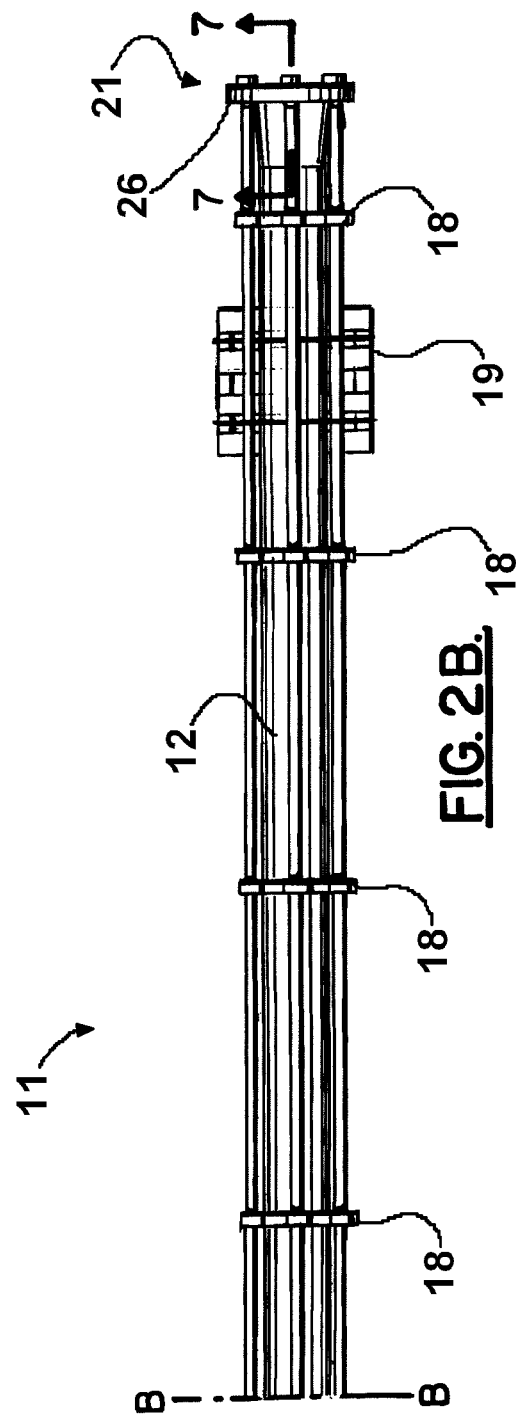

FIGS. 1A-1B and 2A-2B show a riser bundle 11 that is to be serviced or repaired. Riser bundle 11 provides a central tube 12 and a plurality of satellite tubes or conduits or pipes 13, 14, 15, 16 and 17. Intermediate supports 18 are spaced at intervals along the length of the central tube 12 and satellite tubes 13-17. Cradles 19 can be used to support riser bundle 11 as shown in FIGS. 1A-1B and 2A-2B. A more detailed view of a cradle 19 can be seen in FIGS. 3, 4 and 5. Such a cradle 19 can be formed of wood, metal or plastic. Cradle 19 has an upper end portion that is shaped to conform to bundle 11. Riser bundle 11 has end portions 20, 21. An annular flange or support 22 is provided at end portion 20. An annular flange or support 26 is provided at end portion 21. Annular flange 22 provides openings 23, 24. Annular flange 22 provides central opening 25 that is receptive of central tube 12. Openings 24 in annular flange 22 are receptive of satellite tubes or conduits 13-17.

Figure 3:
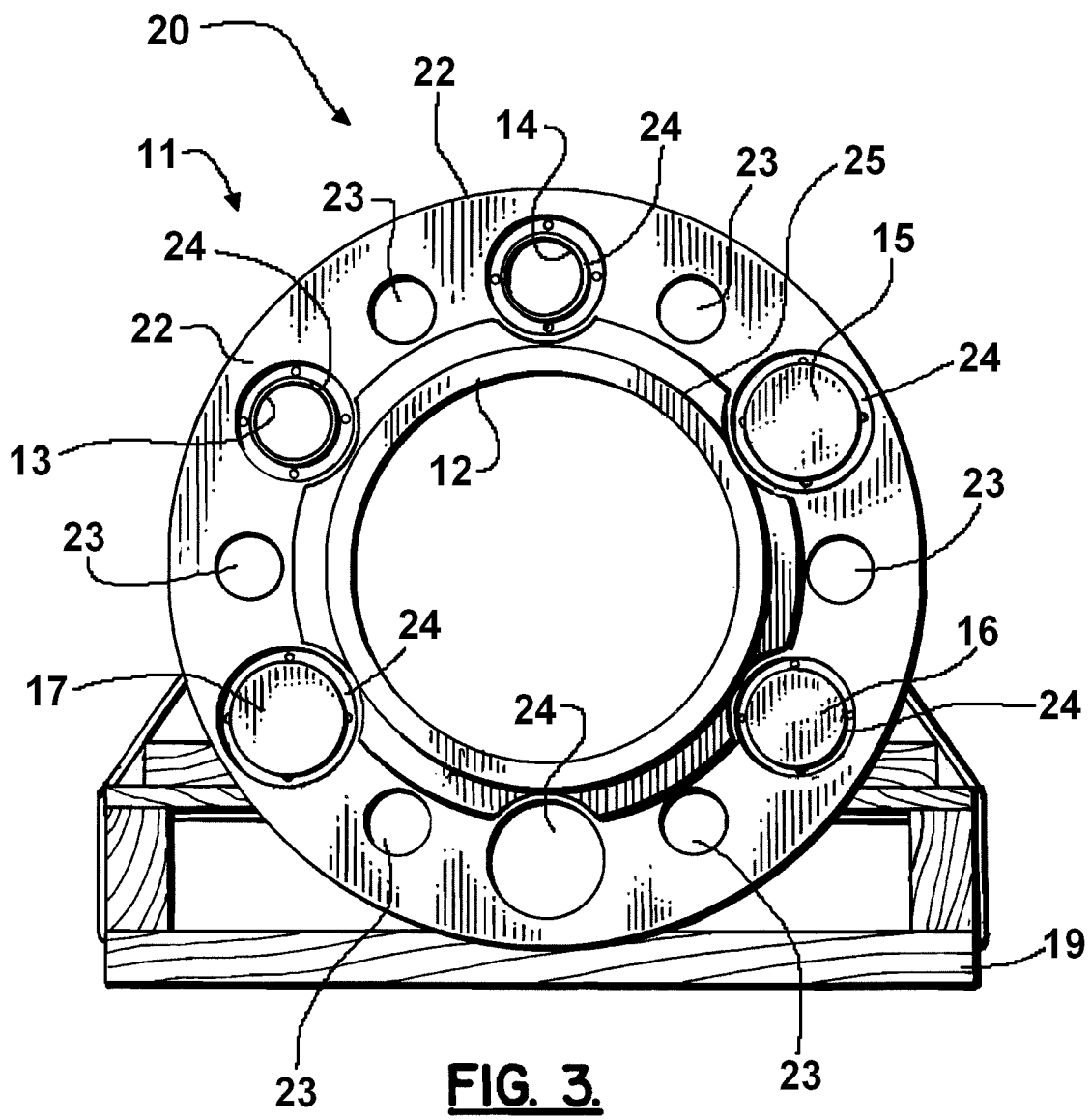
FIG. 3 is an end view taken along lines 3-3 of FIG. 1A.
Figure 4:
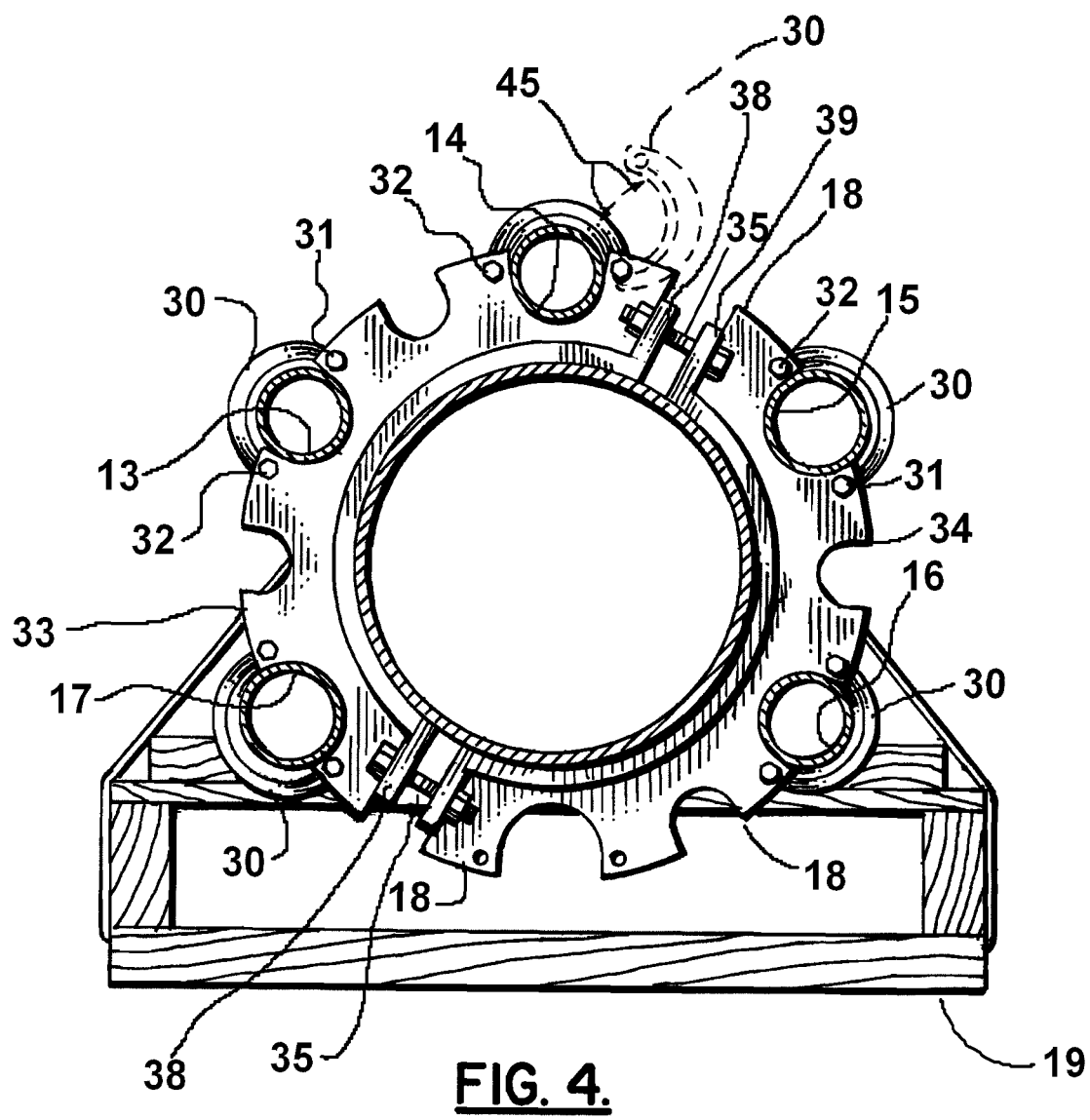
FIG. 4 is a sectional view taken along lines 4-4 of FIG. 1A.
Figure 5:
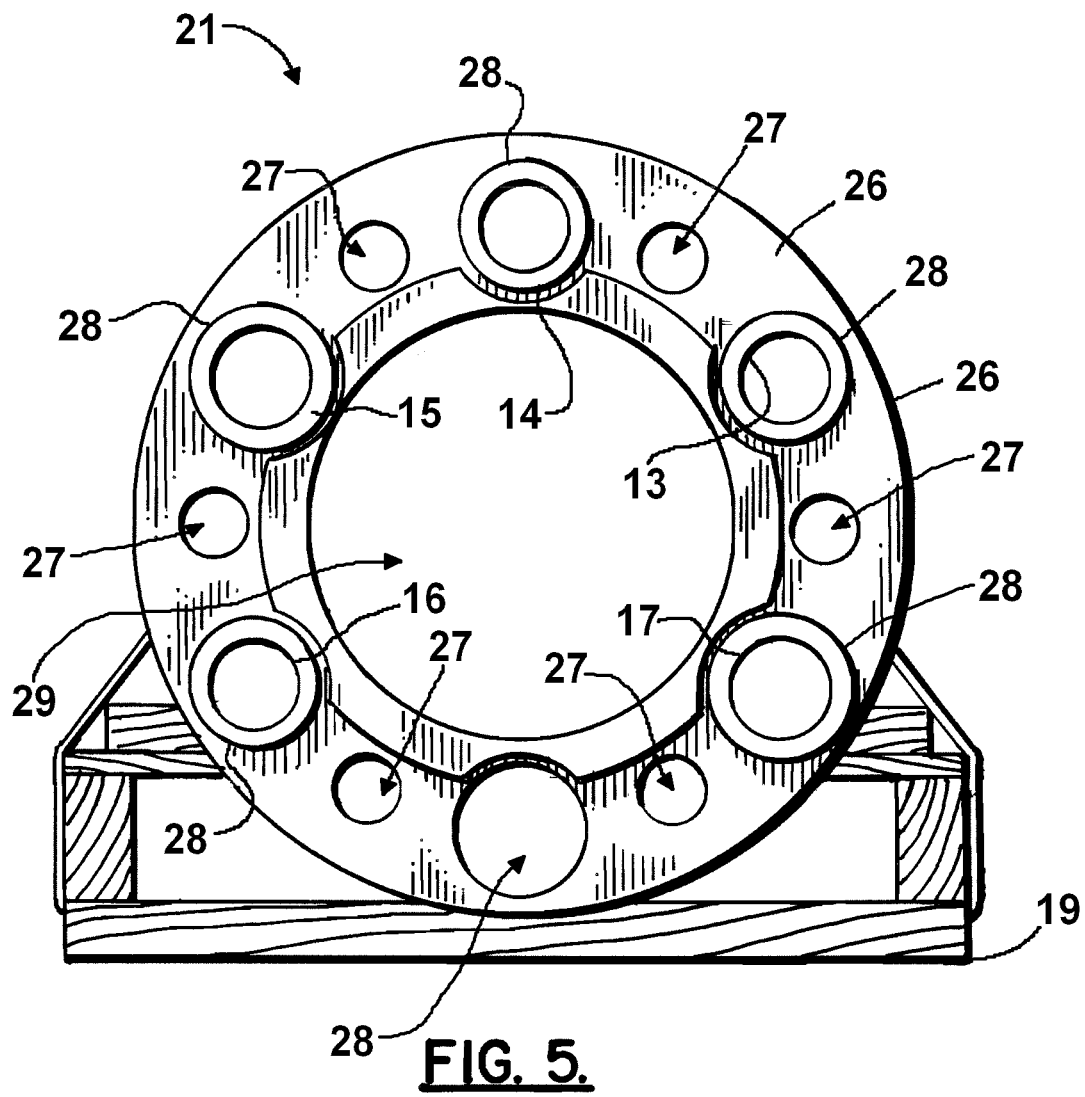
FIG. 5 is an end view taken along lines 5-5 of FIG. 1B.

Annular flange 26 has openings 27, 28. Annular flange 26 has central opening 29. In FIG. 3, flange 22 is shown with central tube 12 occupying opening 25. Satellite tubes or conduits 13-17 occupy openings 24. In FIG. 4, intermediate supports 18 are shown supporting each of the plurality of satellite tubes or conduits 13-17 at positions that are spaced at intervals in between the flanges 22, 26. FIG. 5 shows flange 26 which supports satellite tubes or conduits 13-17 in openings 28 as shown. The flange or support 22 is a support that connects with and supports the male end portions or male connectors 40 of satellite pipes 13-17.

FIG. 4 shows intermediate support 18 in more detail. Each intermediate support 18 is provided with a plurality of clamps 30 that are used to secure a selected satellite tube or conduit or pipe 13-17 to the intermediate support 18. Each clamp 30 includes connections that join it to the intermediate support 18. In FIG. 4, the connections can include a pivotal connection 31 and a bolted connection 32. A clamp 30 is shown in an open position in phantom lines in FIG. 4. Arrows 45 in FIG. 4 illustrate pivotal movement of a clamp 30 between an open position (phantom lines) and a closed position (hard lines).

Each intermediate support 18 can be comprised of a pair of half sections 33, 34. The half sections 33, 34 can be held together with bolted connections 35. Each half section 33, 34 provides a clamping portion that can include flanges next to the bolted connection 35. In FIG. 4, the half section 33 has clamping portion 36. In FIG. 4, half section 34 has clamping portion 37. The clamping portions 36, 37 can provide a pair of flanges 38, 39 through which the bolted connection 35 is inserted. Thus, each flange 38, 39 would provide an opening that is receptive of the bolted connection 35.

Figure 6:
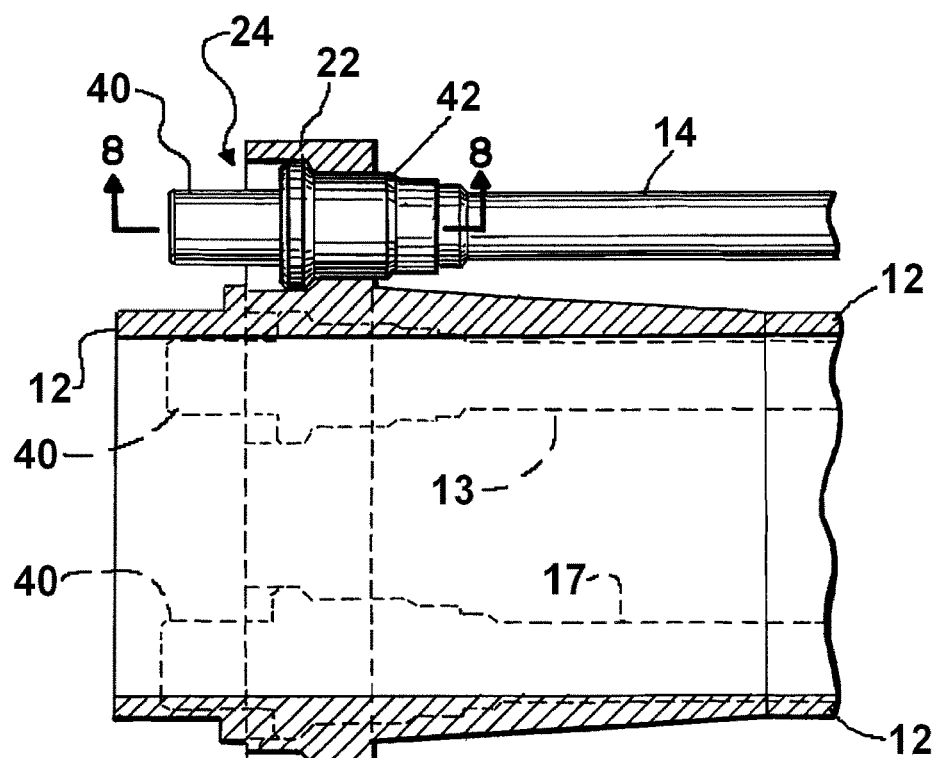
FIG. 6 is a sectional view taken along lines 6-6 of FIG. 2A.
Figure 8:
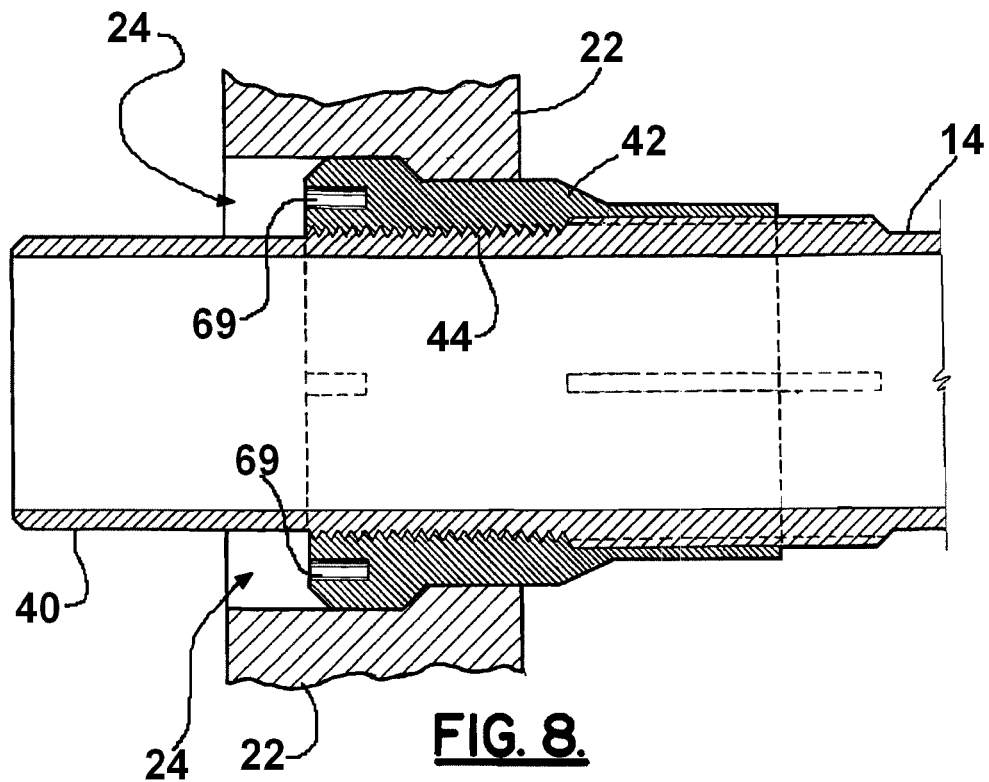
FIG. 8 is a sectional view taken along lines 8-8 of FIG. 6.
Figure 9:
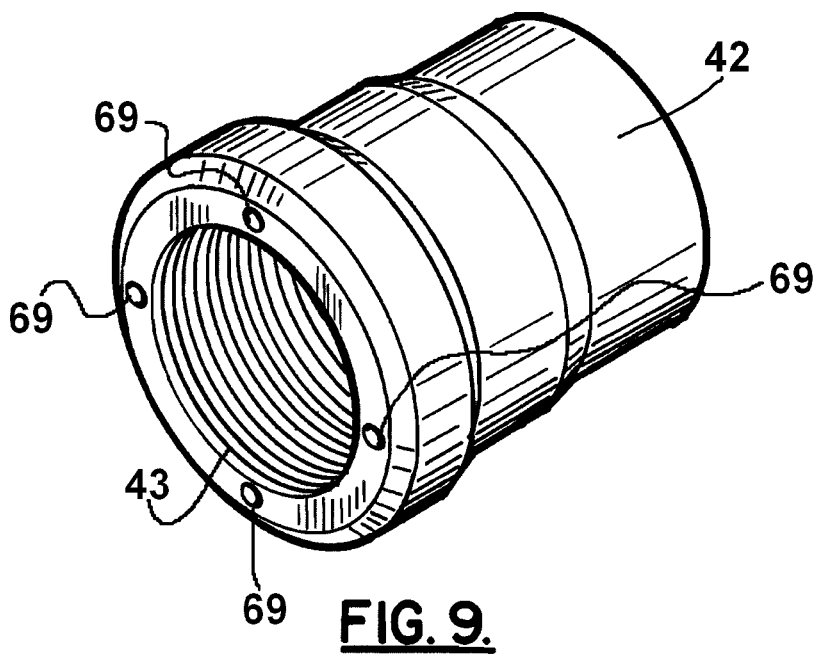
FIG. 9 is a partial perspective view of a part of a satellite tube, conduit or pipe.

The pipe bundle or riser bundle 11 supports the plurality of satellite tubes, conduits, pipes 13-17 in a circumferentially spaced apart position as shown in FIGS. 3 and 4. Each of the satellite tubes or pipes 13-17 has a male connector 40 and a female connector 41. The male connector 40 is joined to the support 22 using a fitting 42 as shown in FIGS. 6 and 8-9. The connection of male connector 40 to annular flange or support 22 using fitting 42 is known. The connection of fitting 42 to male connector 40 uses a threaded connection which employs internal threads 43 on fitting 42 and external threads 44 on male connector 40 as shown in FIGS. 8 and 9.

Figure 7:
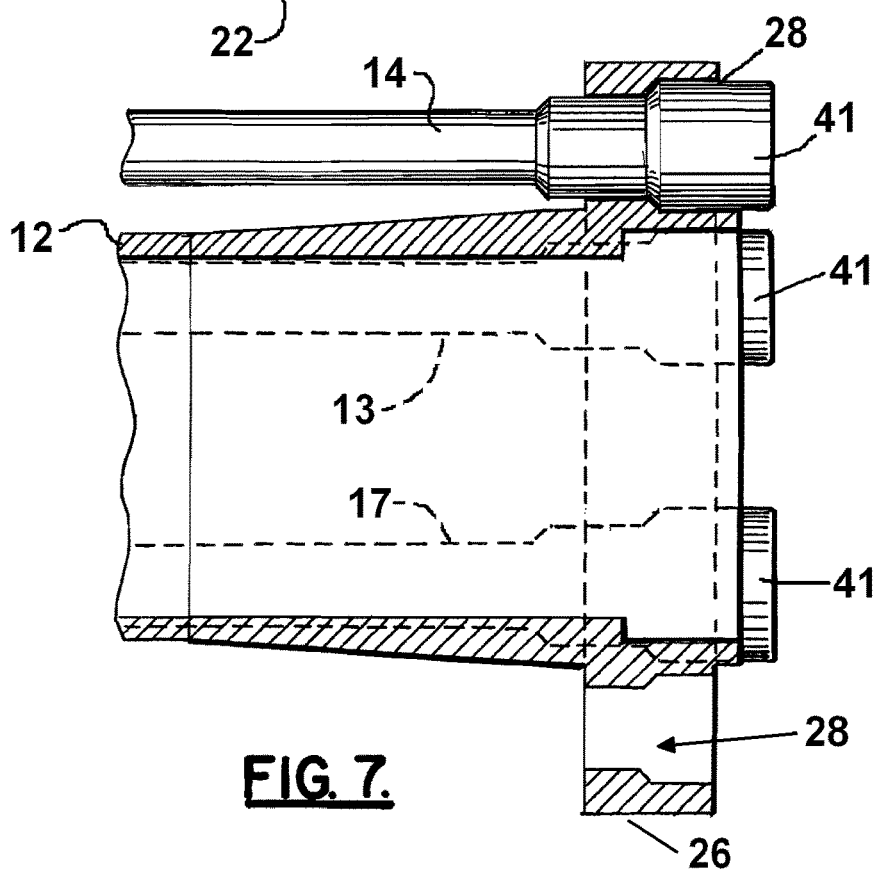
FIG. 7 is a sectional view taken along lines 7-7 of FIG. 2B.

FIG. 7 shows female connector 41 of a satellite tube 14 and its connection to annular flange or support 26. The connection of a female connector 41 of a satellite tube 14 to annular flange or support 26 is known.

In order to remove a selected satellite tube or conduit 13-17 from its supports 18, 22, 26. A hoist 50 arrangement is employed as shown in FIGS. 10A, 10B, 11A, 11B and 12-15. Hoist 50 includes a frame 51 that can have a base 52 with multiple feet 53. Base 52 and feet 53 engage an underlying support surface 46 such as a slab or floor. Base 52 can provide a network of beams including front longitudinal beams 65, rear longitudinal beams 66, and a plurality of horizontal transverse beams 64. Grating or decking 54 can be provided on base 52 for receiving a pipe bundle 11 that is to be serviced.

Figure 12:
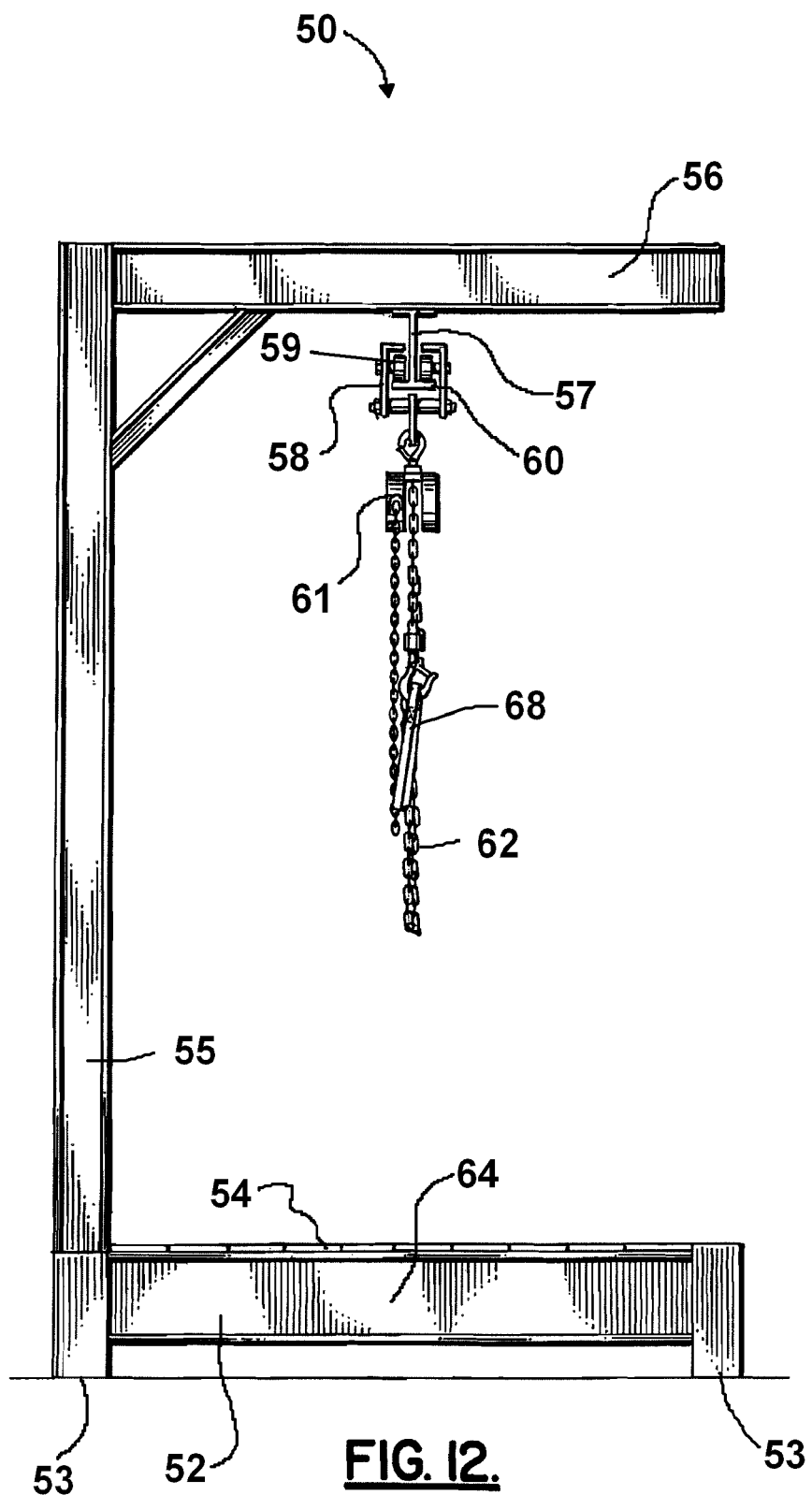
FIG. 12 is an end view taken along lines 12-12 of FIG. 10A.
Figure 13:
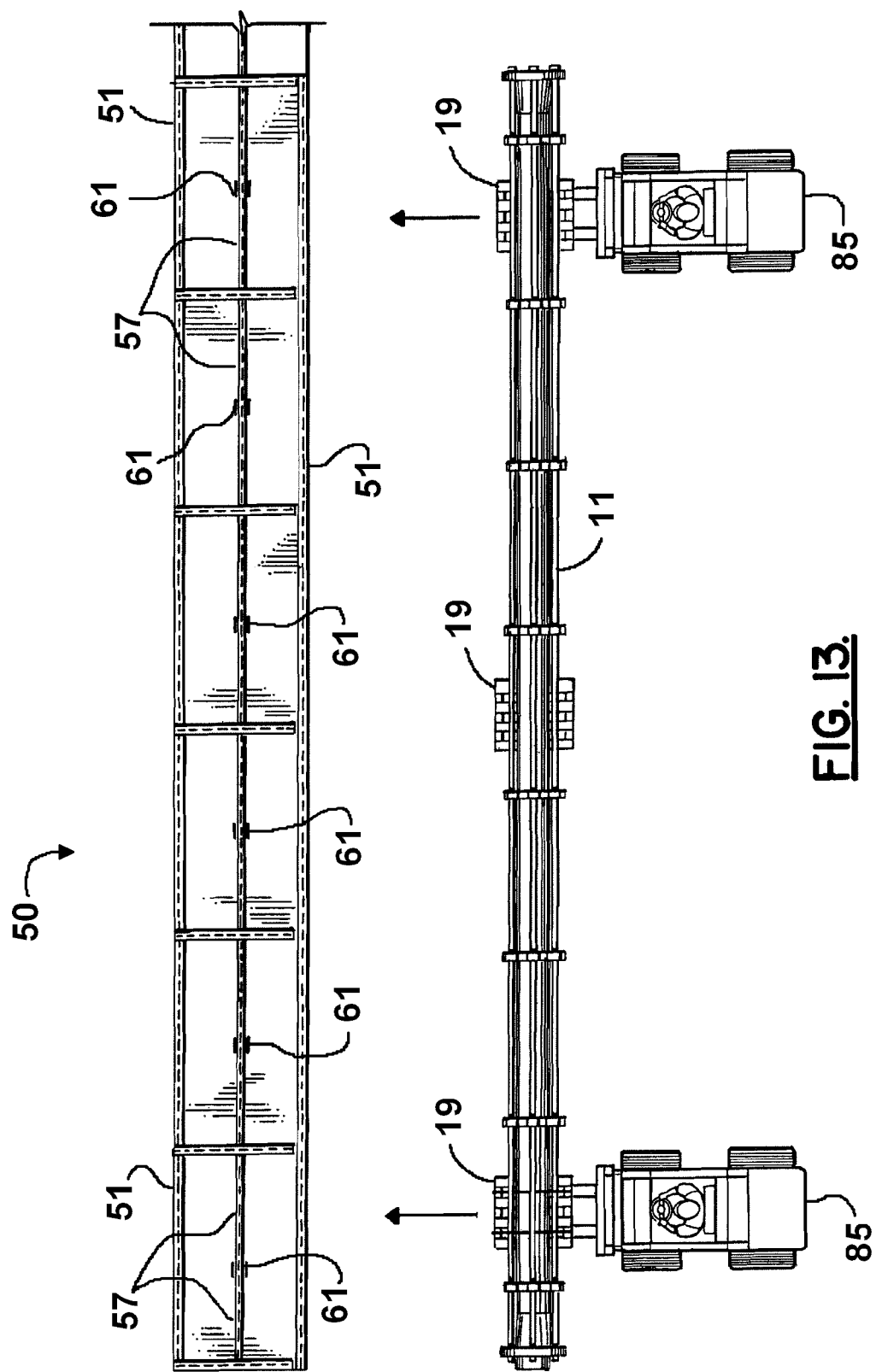
FIG. 13 is a plan view of the preferred embodiment of the apparatus of the present invention and illustrating the method of the present invention.
Figure 14:
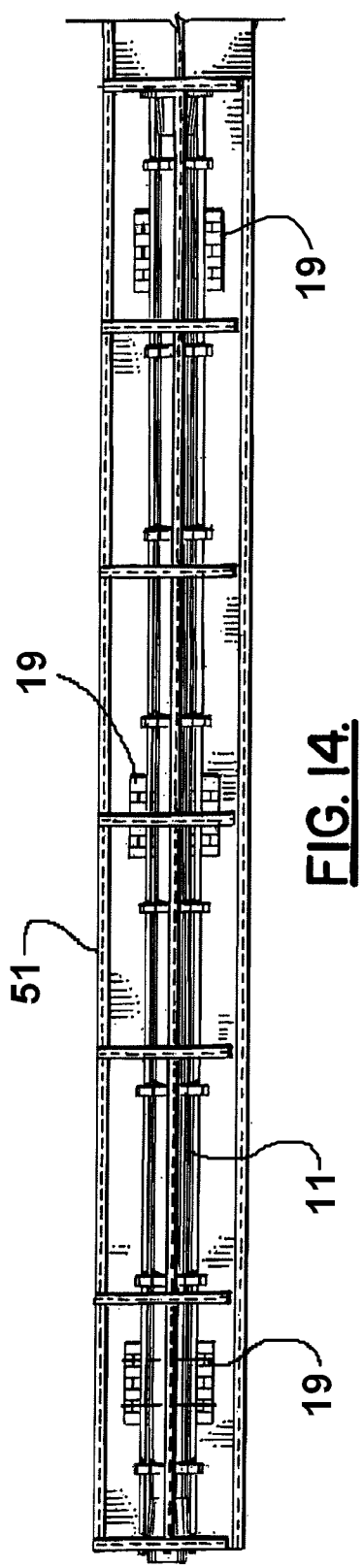
FIG. 14 is a partial plan view of the preferred embodiment of the apparatus of the present invention and illustrating the method of the present invention.
Figure 15:
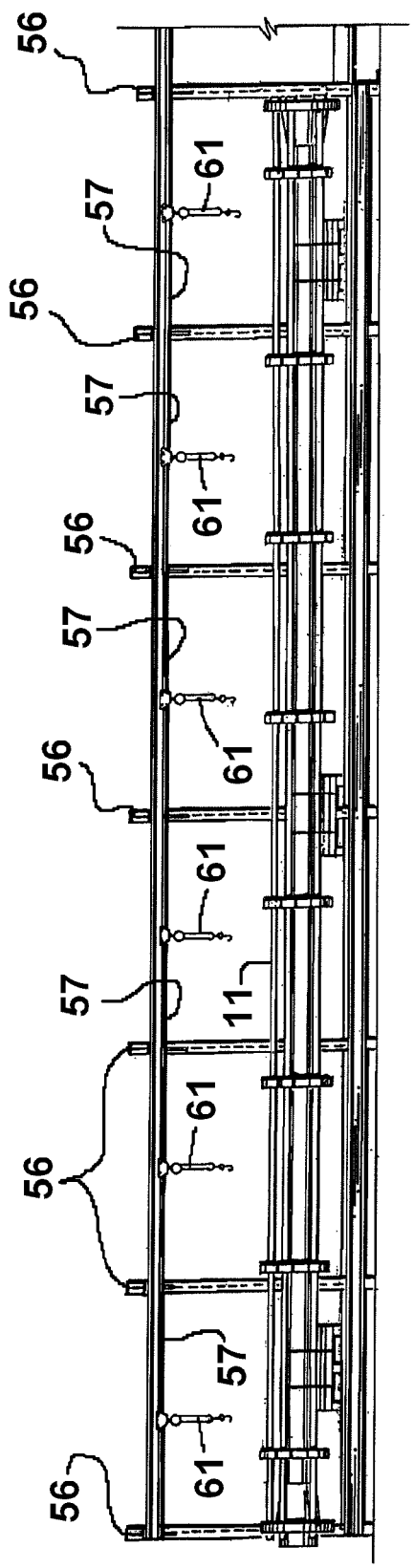
FIG. 15 is an elevation view of the preferred embodiment of the apparatus of the present invention and illustrating the method of the present invention.

Hoist 50 includes a plurality of columns 55 that extend upwardly from base 52. Each column 55 supports an upper horizontal beam 56. Rail 57 spans between multiple of the upper horizontal beams 56 as shown in FIGS. 10A-10B, 11A-11B, and 12-15. A plurality of lifts 61 are provided. Each lift has a carriage 58. The carriage 58 travels along the rail 57 when a particular selected satellite pipe such as 14 is to be removed from its supports 18, 22, 26. Roller bearings 59 can provide an interface between carriage 58 and rail 57 as shown in FIG. 12. Roller bearings 59 can engage flange 60 of rail 57. Other roller bearings can engage other parts of rail 57.

Lift 61 can be any suitable lifting apparatus. The lift 61 can be provided with rigging 68 (for example, sling and shackle). The rigging 68 enables a connection to be made between the lift 61 and the particular satellite pipe 13-17 to be removed from the pipe bundle 11. Such a lift 61 can provide a chain cable or other lifting cable 62.

Figure 16:
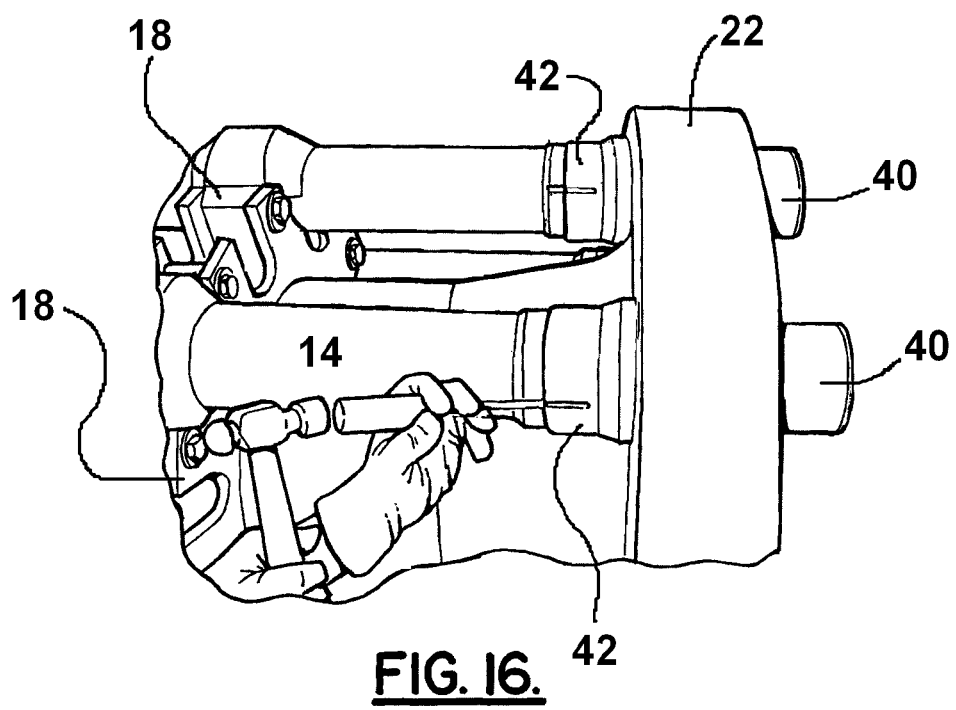
FIG. 16 is a fragmentary perspective view illustrating the method of the present invention.
Figure 17:
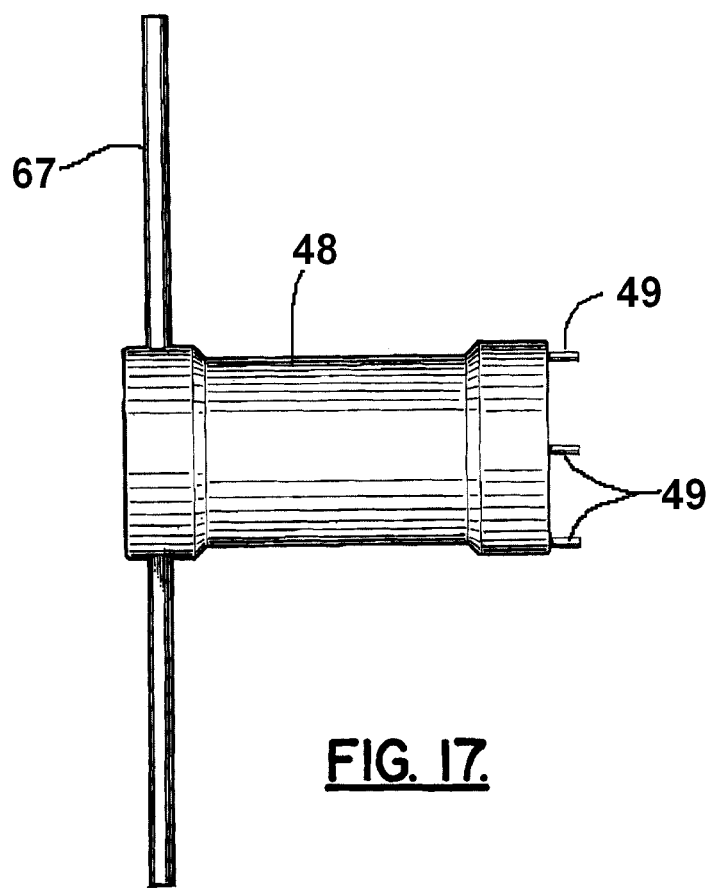
FIG. 17 is a fragmentary view illustrating a removal tool for removing part of a satellite tube or conduit.
Figure 21:
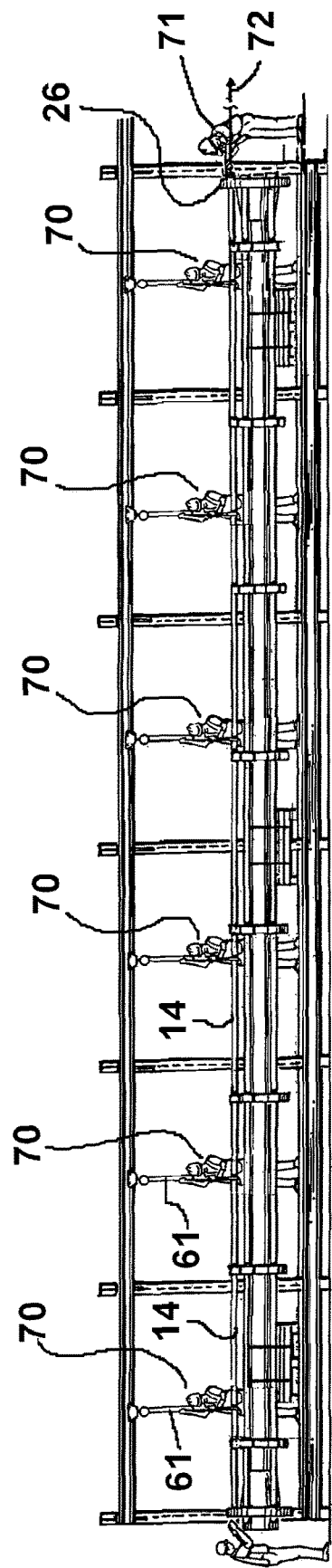
FIG. 21 is an elevation view illustrating part of the method of the present invention.

When a particular satellite pipe or conduit such as conduit 14 is to be removed from pipe bundle or riser bundle 11, each of the lifts 61 is attached to the selected satellite pipe 14 as shown in FIG. 21. However, before lifting selected satellite pipe 14 from the bundle 11, fitting 42 must be removed using tool 48. In order to remove the fitting 42, a protector sleeve 47 is inserted over male connector 40 as shown in FIGS. 18 and 19. Tool 48 has projections 49 that engage correspondingly shaped recesses 69 in fitting 42 as shown in FIG. 19. Fittings 42 have in some cases have penned portions that must be removed using a hammer and chisel as shown in FIG. 16. FIG. 20 illustrates satellite pipe 14, its male connector 40 with fitting 42 having been removed.

After the fitting 42 has been removed, each of the lifts 61 is connected to a selected pipe (e.g. 14). Lift 61 are manned by a human operator 70. This operator 70 receives instructions from a supervisor 71. The supervisor 71 is positioned next to annular flange 26 and next to the female end or female connector 41 of the satellite pipe 14 to be removed. In this fashion, any one of the operators 70 can be given instructions to either elevate or lower that portion of the satellite pipe 14 to which a particular lift 61 is connected. The supervisor 70 controls movement of the satellite pipe 14 in the direction of arrow 72 in FIGS. 21 and 23.

Figure 23:
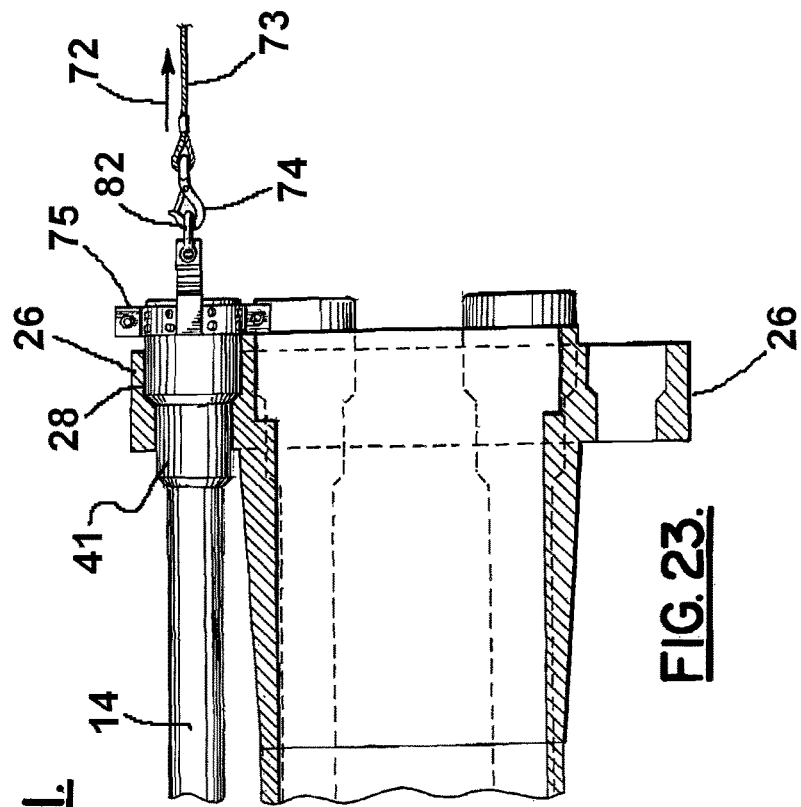
FIG. 23 is a partial sectional view of the preferred embodiment of the apparatus of the present invention and showing a part of the method of the present invention.
Figure 22:
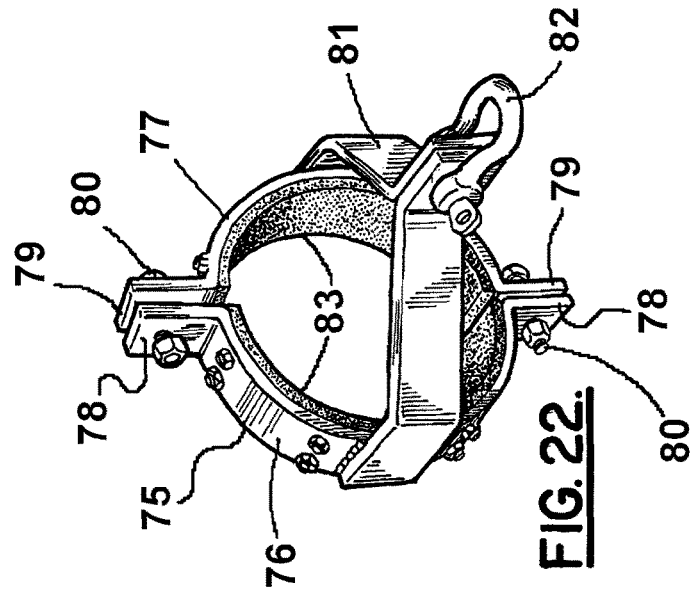
FIG. 22 is a perspective view illustrating a fitting for removing a satellite tube or conduit from a riser bundle.

In order to move the pipe 14 in the direction of arrow 72, a pulling tool 75 is clamped to the female connector 41 of pipe 14 as shown in FIG. 23. Pulling tool 75 is attached to cable 73 using hook 74 and shackle 82. Pulling tool 75 can be comprised of a pair of half sections 76, 77. Each half section 76, 77 provides flanges 78, 79 that are held together using bolted connections 80 as shown in FIG. 22. The bolted connections 80 can apply pressure to hold the pulling tool 75 tightly to the female end or female connector 41 of pipe 14. While the cable 73 is being pulled in the direction of arrow 72, each of the operators 70 operates his or her lift 61 to elevate the selected pipe 13-17 (such as pipe 14) above its supports 18, 22, 26 a selected distance.

In FIG. 21, the supervisor 71 is watching the pipe 14 as it moves through an opening 28 in annular flange or support 26. Shackle 82 can be attached to a yoke or bridle 81 that is welded to the half sections 76, 77 as shown in FIG. 22. Padding 83 can be added to the inner surface of each of the half sections 76, 77 as shown in FIG. 22.

Figure 24:
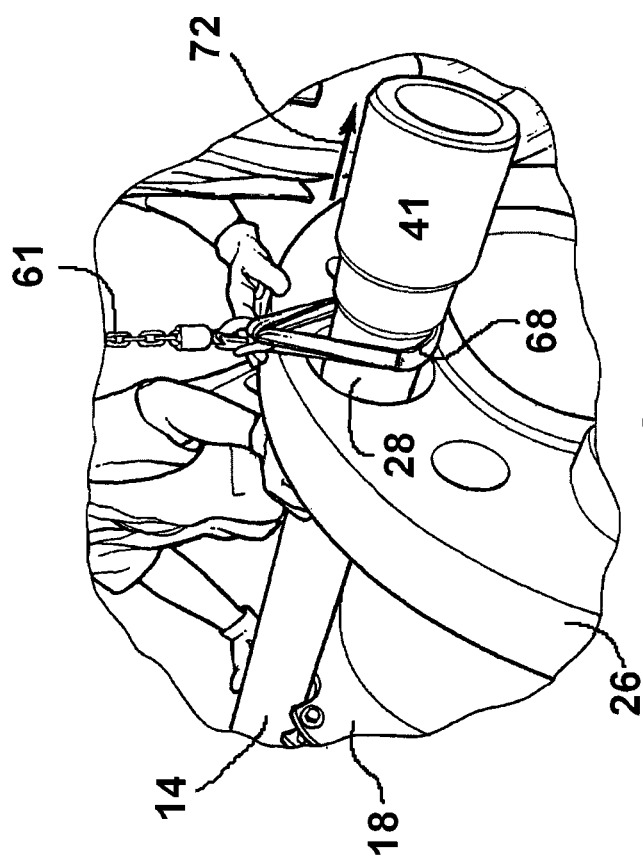
FIG. 24 is a partial perspective view illustrating a part of the method of the present invention.
Figure 25:
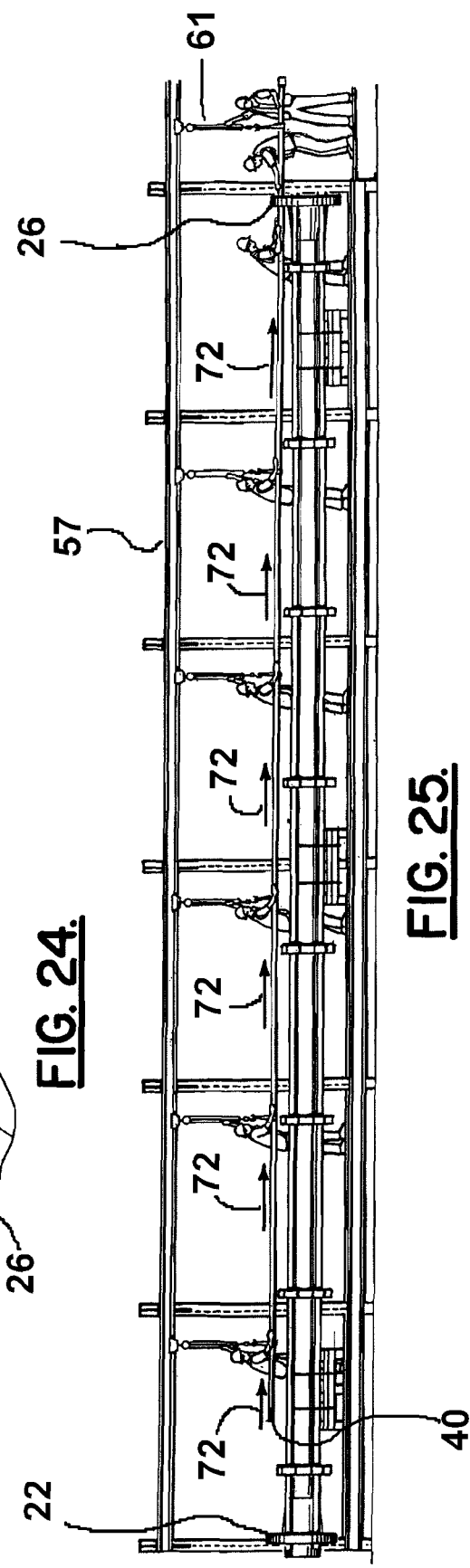
FIG. 25 is an elevation view illustrating a part of the method of the present invention.

FIGS. 24 and 25 illustrate movement of satellite pipe 14 and female end 41 in the direction of arrows 72 and after fitting 42 is removed from support 22 and female connector 41 has separated from opening 28 in annular flange 26. FIG. 24 is an enlargement of the area next to support 26. FIG. 25 illustrates that a lift 61 has traveled along rail 57 with pipe 14. Lifts 61 are now on both sides of support 26 as shown. Notice in FIG. 25 that the male end 40 of pipe 14 has now moved away from support 22 and toward support 26. FIG.

27 illustrates further movement of pipe 14 in the direction of arrow 72 so that the female connector 41 is now spaced a good distance away from the support 26. In FIGS. 28 and 29, the male end 40 passes through opening 28 in support 26. In FIG. 29, the pipe 14 has been removed from the pipe bundle 11 and is still supported by the plurality of lifts 61, each manned by an operator 70.

Figure 26:
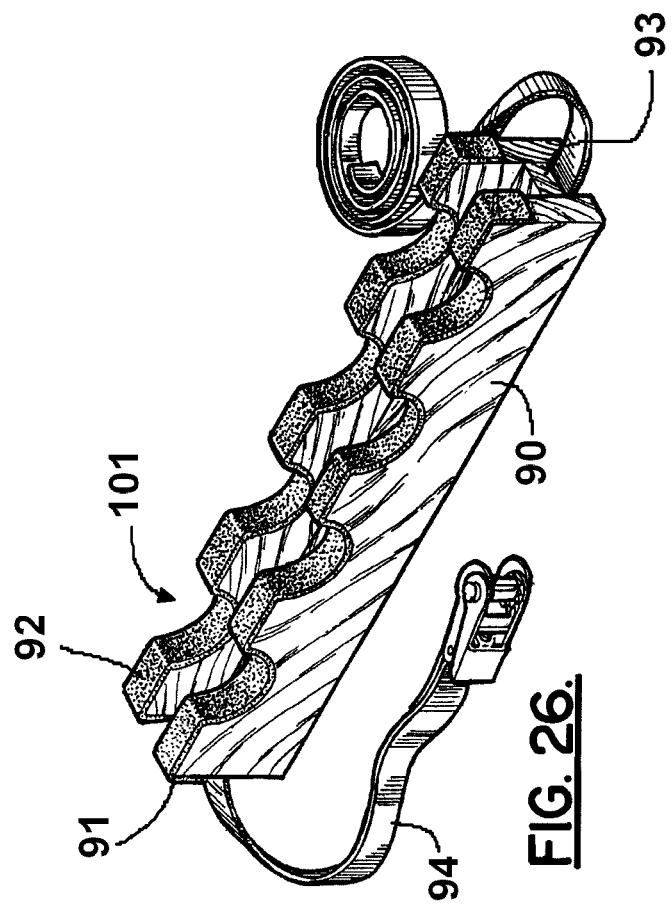
FIG. 26 is a perspective view illustrating a storage rack for storing one or more satellite tubes or conduits that have been removed from a riser bundle.
Figure 27:
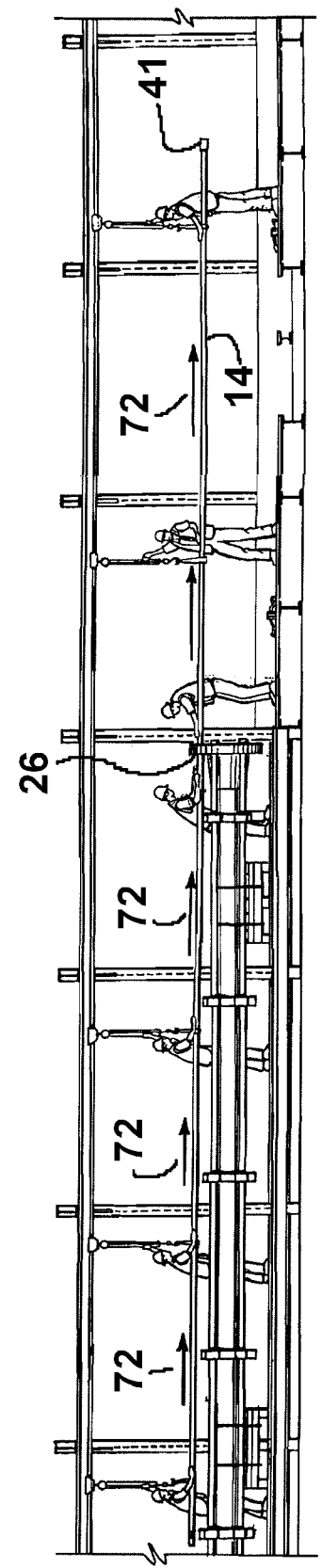
FIG. 27 is an elevation view illustrating a part of the method of the present invention.

In FIG. 26, a satellite pipe rack 90 is shown. The rack or holder 90 provides sections 91, 92. Each of the sections 91, 92 can be provided with a plurality of semicircular recesses 93 that are receptive of one or more satellite pipes 13-17 to be supported. An elongated strap or other rigging 94 can be used to hold the selected satellite pipes 13-17 to the rack 90. A beam 101 can be provided in between the sections 91, 92 as shown in FIG. 26. The strap or rigging 94 can encircle a combination of the beam 101 and pipes 13-17 to be secured.

Figure 30:
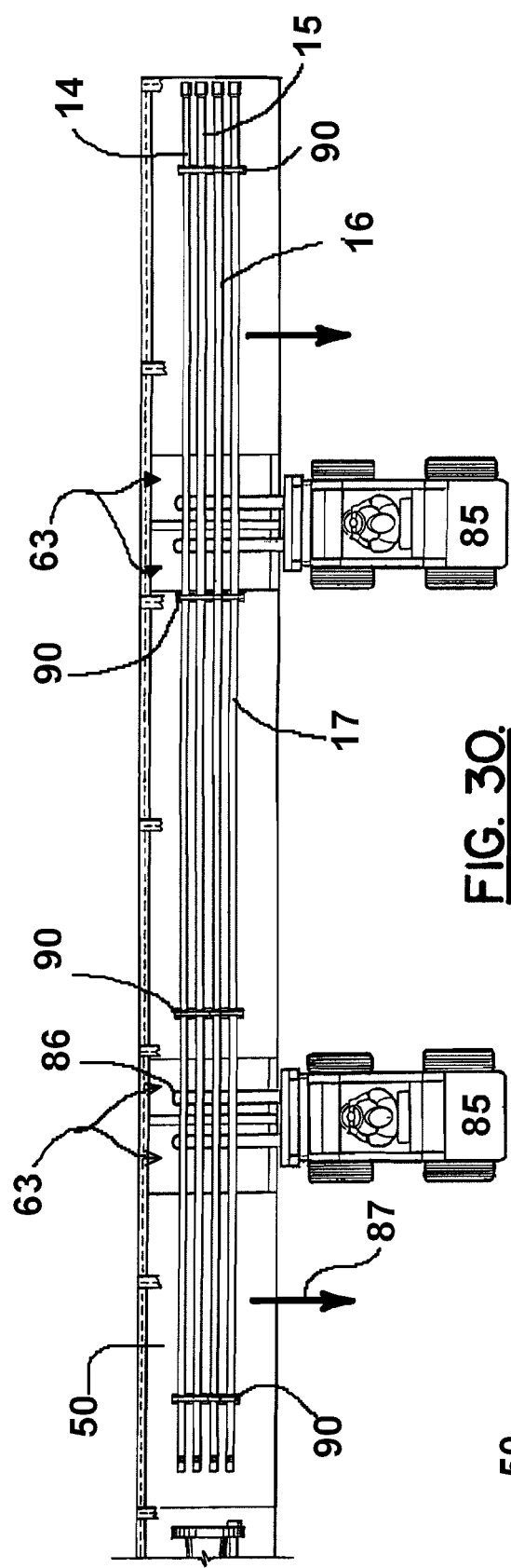
FIG. 30 is an plan view illustrating a part of the method of the present invention.
Figure 31:
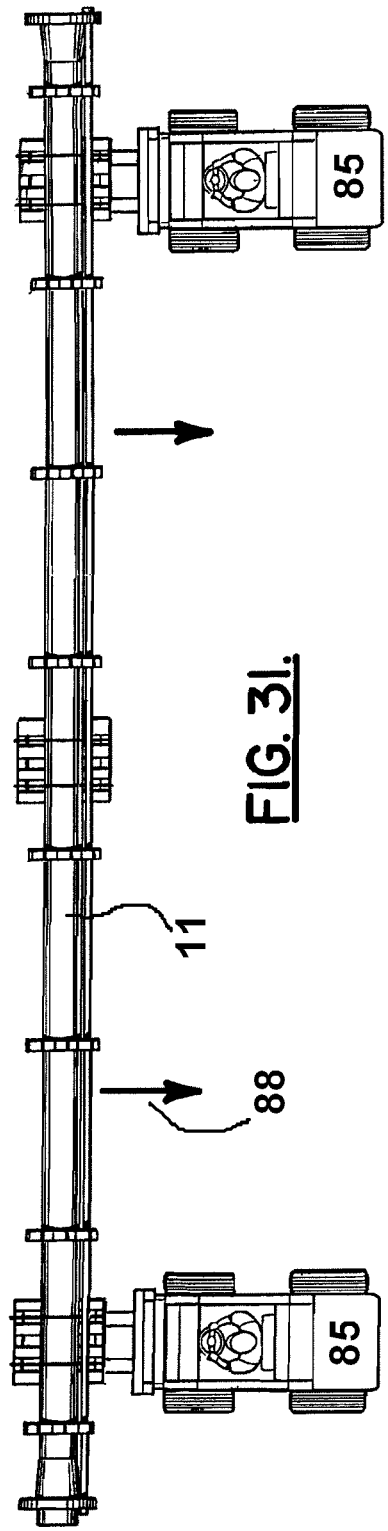
FIG. 31 is an plan view illustrating a part of the method of the present invention.

FIG. 30 illustrates four satellite pipes, each held by multiple racks 90 after removal of the selected satellite pipes 14-17 from pipe bundle 11. Forklifts 85 or other suitable wheeled vehicle can be used to lift the collection of pipes 14-17 that are held in the racks 90. Forklift tines 86 fit into open areas or gaps 63 in the decking or grating 54 of base 52 as shown in FIG. 30. Arrows 87 illustrate removal of the combination of satellite pipes 14-17 and racks 90 from hoisting apparatus 50 after bundle 11 has been serviced, it can be removed from decking 54 as illustrated by arrows 88 in FIG. 31. In FIG. 31 the selected satellite pipes 14-17 have been removed from bundle 11.

FIGS. 32-45 illustrate a reinstallation of the selected satellite pipes 14-17 after they have been serviced, such as provided with one or more selected anti-corrosive coatings.

Figure 34:
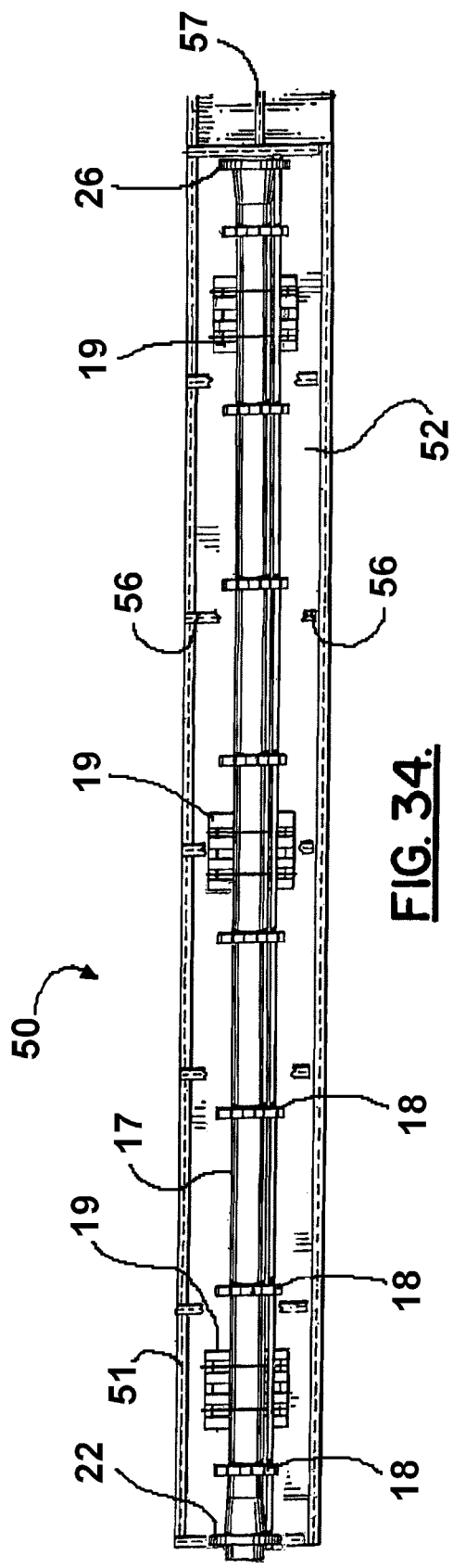
FIG. 34 is an plan view illustrating a part of the method of the present invention.
Figure 35:
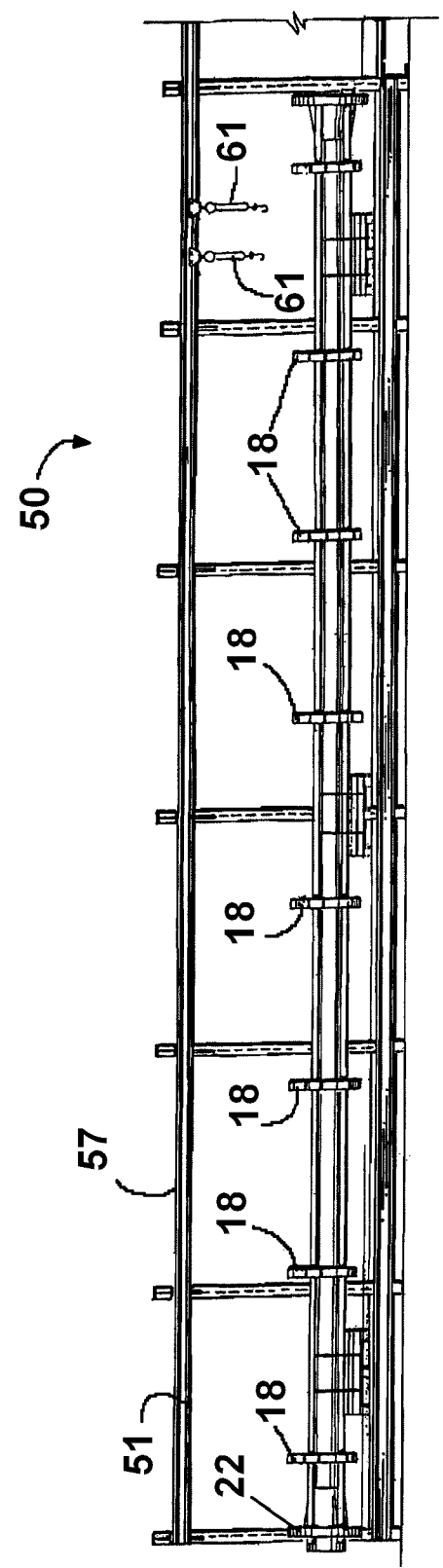
FIG. 35 is an elevation view illustrating a part of the method of the present invention.
Figure 41:
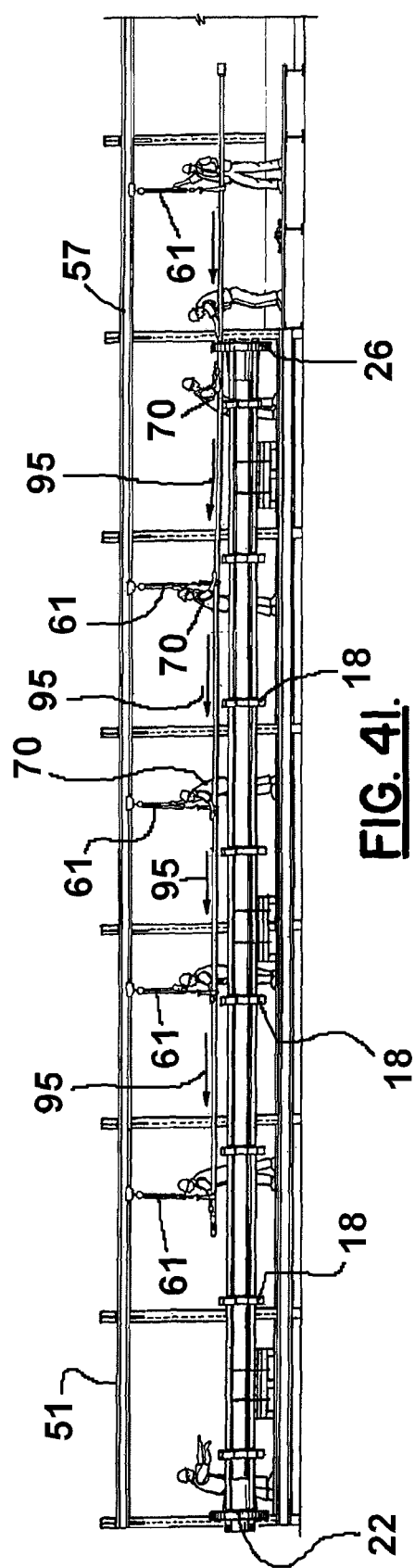
FIG. 41 is an elevation view illustrating a part of the method of the present invention.
Figure 42:
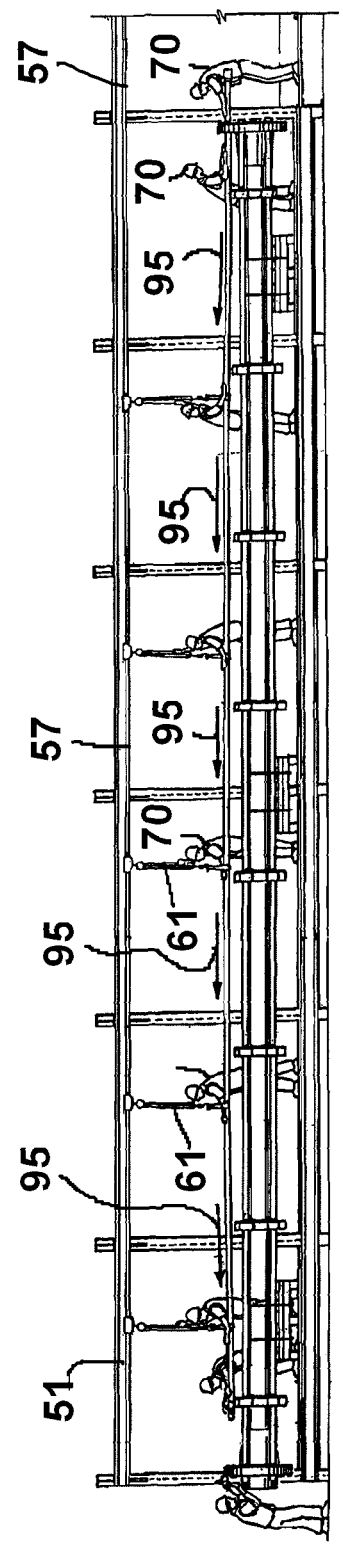
FIG. 42 is an elevation view illustrating a part of the method of the present invention.

In FIG. 32, a pair of wheeled vehicles, namely forklifts 85 are shown carrying the cradles 19 that are attached to a part of a riser bundle 11 that has some of all of its satellite pipes 14-17 removed. In FIG. 32, the forklifts 85 are transporting the larger pipe 12, intermediate supports 18, end supports 22, 26 and some of the satellite pipes to the hoist apparatus 50. In FIG. 33, there are a plurality of satellite pipes 14-17 that have been serviced and are to be returned to the pipe bundle 11 as shown by arrow 84. In FIG. 33, each of the serviced satellite pipes 14-17 are held in a pipe rack or holder 90 such as the one that was shown and described with respect to FIG. 26. In FIG. 34, the cradles 19, large pipe 12, and intermediate supports 18 are shown after having been placed upon base 52 of hoist 50. In FIG. 34, the end supports 22 and 26 are also a part of the pipe bundle 11 less those satellite pipes 14-17 that have been serviced and are to be returned to the bundle 11. In FIG. 36, operators 70 and their supervisor 71 are shown attaching individual lifts 61 to a satellite pipe 14 that is to be returned to the bundle 11. Arrows 89 in FIG. 36 illustrate a lifting of the satellite pipe 14 using the plurality of lifts 61 shown in FIG. 36.

FIG. 37 illustrates a movement of the satellite pipe 14 in the direction of arrows 95. In FIG. 37, the male connector 40 end of pipe 14 has passed through an opening in support 26 as shown. During this reassembly of satellite pipe 14 to bundle 11, lifts 61 are shown on both sides of support 26 in FIG. 37. FIG. 38 illustrates a protective sleeve 96 that can be rolled as indicated by arrows 97 into a cylinder shape wherein the cylinder shape is designated by the numeral 98. In FIG. 38, an annular flange 99 is provided having gaps at 100. The protective sleeve 96 is placed over the male connector 40 part of pipe 14 and threaded through end support 26 as shown in FIG. 39. In this fashion, the external threads 44 are protected from damage.

Figure 43:
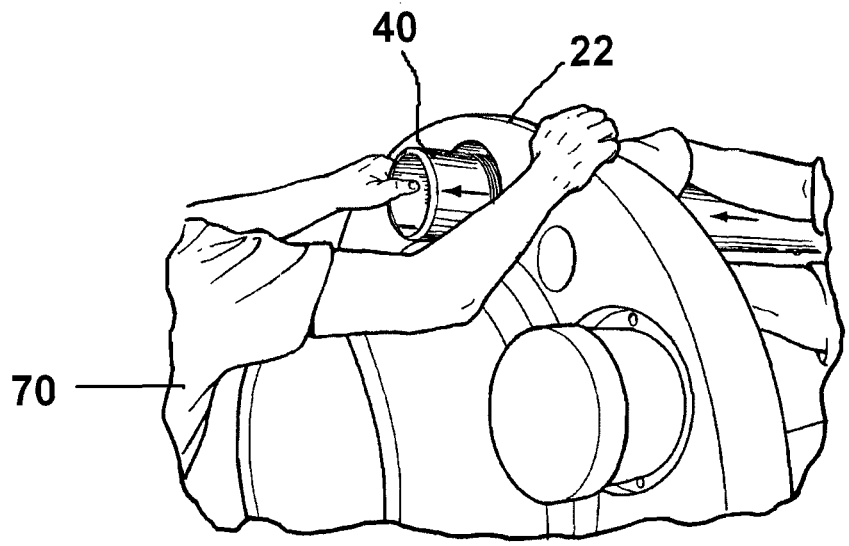
FIG. 43 is a partial perspective view illustrating a part of the method of the present invention.
Figure 44:
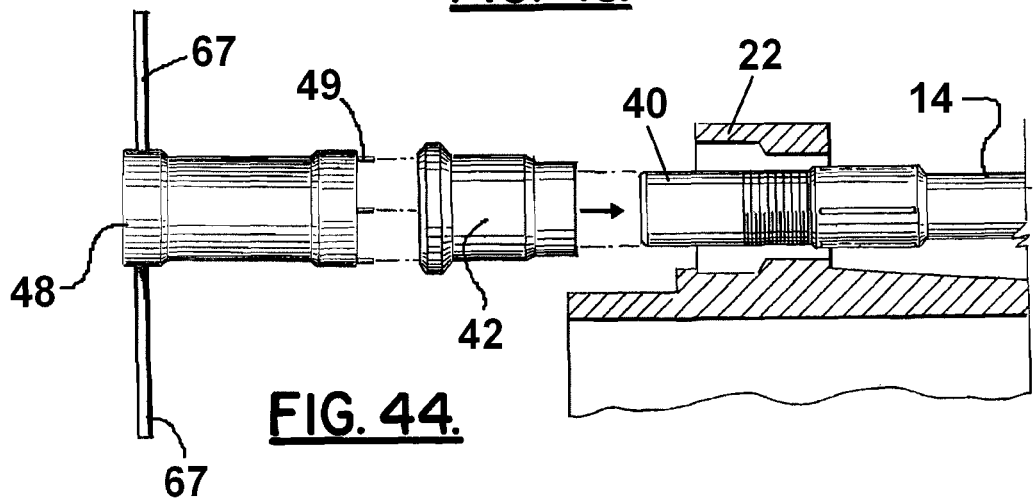
FIG. 44 is a partial sectional elevational view illustrating a part of the method of the present invention.
Figure 45:
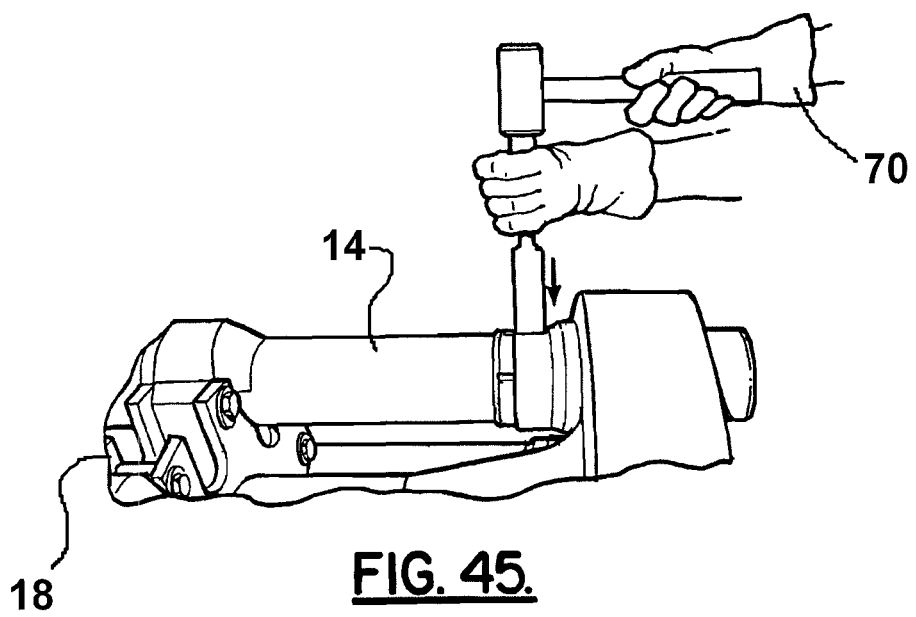
FIG. 45 is a partial perspective view illustrating a part of the method of the present invention.

FIG. 40 illustrates further movement of satellite pipe 14 in the direction of arrows 95 and wherein most of the satellite pipe 14 has been added to the pipe bundle 11. In FIG. 43, the male connector 40 has reached the support 22. In FIG. 44, tool 48 is shown reattaching fitting 42 to satellite pipe 14. FIG. 45 illustrates removal of the sleeve 96.

The following is a list of parts and materials suitable for use in the present invention.

| PARTS LIST | |
|---|---|
| Part Number | Description |
| 10 | riser handling system |
| 11 | riser bundle/pipe bundle |
| 12 | central tube |
| 13 | satellite tube/conduit/pipe |
| 14 | satellite tube/conduit/pipe |
| 15 | satellite tube/conduit/pipe |
| 16 | satellite tube/conduit/pipe |
| 17 | satellite tube/conduit/pipe |
| 18 | intermediate support |
| 19 | cradle |
| 20 | end portion |
| 21 | end portion |
| 22 | annular flange/support |
| 23 | opening |
| 24 | opening |
| 25 | opening |
| 26 | annular flange/support |
| 27 | opening |
| 28 | opening |
| 29 | opening |
| 30 | clamp |
| 31 | pivotal connection |
| 32 | bolted connection |
| 33 | half section |
| 34 | half section |
| 35 | bolted connection |
| 36 | clamping portion |
| 37 | clamping portion |
| 38 | flange |
| 39 | flange |
| 40 | male connector |
| 41 | female connector |
| 42 | fitting |
| 43 | internal threads |
| 44 | external threads |
| 45 | arrow |
| 46 | underlying support surface |
| 47 | sleeve |
| 48 | tool |
| 49 | projection |
| 50 | hoist |
| 51 | frame |
| 52 | base |
| 53 | foot |
| 54 | grating/decking |
| 55 | column |
| 56 | upper horizontal beam |
| 57 | rail |
| 58 | carriage |
| 59 | roller bearing |
| 60 | flange |
| 61 | lift |
| 62 | lift cable/chain |
| 63 | gap/opening |
| 64 | horizontal transverse beam |
| 65 | front longitudinal beam |
| 66 | rear longitudinal beam |
| 67 | socket |
| 68 | rigging |
| 69 | recess |
| 70 | operator |
| 71 | supervisor |
| 72 | arrow |
| 73 | cable |
| 74 | hook |
| 75 | pulling tool |
| 76 | half section |
| 77 | half section |

-continued

PARTS LIST

| Part Number | Description |
|---|---|
| 78 | flange |
| 79 | flange |
| 80 | bolted connection |
| 81 | yoke/bridle |
| 82 | shackle |
| 83 | padding |
| 84 | arrow |
| 85 | forklift |
| 86 | tine |
| 87 | arrow |
| 88 | arrow |
| 89 | arrow |
| 90 | pipe rack/holder |
| 91 | section |
| 92 | section |
| 93 | recesses |
| 94 | strap/rigging |
| 95 | arrow |
| 96 | sleeve |
| 97 | arrow |
| 98 | cylinder |
| 99 | flange |
| 100 | gap |
| 101 | beam |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A method of removing a satellite pipe from a pipe bundle that includes multiple satellite pipes supported by a plurality of spaced apart supports that include end supports and intermediate supports, comprising the steps of;
   a) supporting the pipe bundle;
   b) providing a hoisting apparatus that includes an overhead rail, the overhead rail extending at least partially along the pipe bundle;
   c) attaching a plurality of lifts to the selected satellite pipe, each lift having and being supported by a carriage, enabling the lift to travel along the overhead rail;
   d) separating the satellite pipe from the intermediate supports and at least one of the end supports;
   e) elevating the selected satellite pipe with the lifts of step "c", each lift being able to change the elevation of the pipe independently of the other lifts; and
   f) moving the pipe toward one of the end supports, wherein at least one of the lifts moves simultaneously with the satellite pipe, and at least one of the plurality of lift carriages also moves with the pipe.

2. The method of claim 1 wherein in step "f" the end support has an opening and the satellite pipe moves through the opening until it is separated from the pipe bundle.

3. The method of claim 1 wherein each support spaces the satellite pipes circumferentially apart.

4. The method of claim 1 wherein the pipe bundle is transported laterally from a first position spaced away from the hoisting apparatus to a second position which is the position of step "a".

5. The method of claim 4 wherein the pipe bundle is transported laterally by lifting the pipe bundles with one or more wheeled vehicles.

6. The method of claim 1 wherein the pipe bundle is transported laterally by lifting the pipe bundles with one or more fork lift vehicles.

7. The method of claim 1 further comprising the step of supporting the pipe bundle with multiple cradles, each cradle having a base that is configured to rest upon an underlying generally flat support surface.

8. The method of claim 7 wherein each cradle has an upper end portion that conforms to the shape of the pipe bundle.

9. The method of claim 7 wherein each cradle is in between a pair of supports.

10. The method of claim 1 wherein each of the satellite pipes has a male end portion and a female end portion, the end supports being male and female end supports, and in step "f" the satellite pipe male is supported by the male end support and wherein the satellite pipe travels toward the female end support.

11. The method of claim 10 wherein the male end portion of each satellite pipe is connected to an end support with a fitting and further comprising removing the fitting.

12. The method of claim 10 further comprising applying tension to the female end portion of the satellite pipe during step "f".

13. The method of claim 1 wherein the hoisting apparatus has a base with decking.

14. The method of claim 13 wherein the decking has open areas and the pipe bundle is transported laterally by lifting the pipe bundles with one or more fork lift vehicles having fork lift tines that extend into the open areas.

15. The method of claim 1 wherein in step "e" a human operator is positioned next to and operates the lift.

16. The method of claim 15 wherein in step "e" a supervisor conveys commands to the operators regarding elevation information for a particular lift.

17. The method of claim 16 wherein the supervisor is positioned next to one of the bundle end supports.

18. The method of claim 1 wherein in step "c" there is a lift positioned in between a pair of supports.

19. The method of claim 18 wherein in step "c" there is a lift positioned in between a pair of supports.

20. The method of claim 1 further comprising applying tension to one end portion of the satellite pipe during step "f".

* * * * *